US008155988B2

(12) United States Patent
Kunichika et al.

(10) Patent No.: US 8,155,988 B2
(45) Date of Patent: Apr. 10, 2012

(54) WORKFLOW MANAGEMENT INCLUDING DETERMINATION IF A REQUESTOR IS IN CHARGE OF TASKS

(75) Inventors: Yohei Kunichika, Tokyo (JP); Harald Holz, Kaiserslautern (DE); Oleg Rostanin, Kaiserslautern (DE); Michael Niemann, Darmstadt (DE)

(73) Assignee: Ricoh Company, Ltd., Tokyo (JP)

( * ) Notice: Subject to any disclaimer, the term of this patent is extended or adjusted under 35 U.S.C. 154(b) by 550 days.

(21) Appl. No.: 11/846,113

(22) Filed: Aug. 28, 2007

(65) Prior Publication Data

US 2008/0313024 A1  Dec. 18, 2008

(51) Int. Cl.
*G06F 17/00* (2006.01)

(52) U.S. Cl. ...................................................... 705/7.11

(58) Field of Classification Search .................. 705/7, 11, 705/7.11
See application file for complete search history.

(56) References Cited

U.S. PATENT DOCUMENTS

| | | | | |
|---|---|---|---|---|
| 5,406,476 A * | 4/1995 | Deziel et al. | ....................... | 705/8 |
| 5,913,201 A * | 6/1999 | Kocur | ................................ | 705/9 |
| 6,249,715 B1 * | 6/2001 | Yuri et al. | ..................... | 700/111 |
| 6,289,513 B1 * | 9/2001 | Bentwich | ...................... | 717/106 |
| 6,501,473 B1 * | 12/2002 | Hayes et al. | .................. | 345/440 |
| 6,574,605 B1 * | 6/2003 | Sanders et al. | .................... | 705/8 |
| 2002/0120486 A1 * | 8/2002 | Thompson | ........................ | 705/9 |
| 2005/0144058 A1 * | 6/2005 | Luo | ................................... | 705/8 |
| 2005/0159990 A1 * | 7/2005 | Barrett | ............................. | 705/8 |

FOREIGN PATENT DOCUMENTS

| | | |
|---|---|---|
| JP | 5-40763 | 2/1993 |
| JP | 5-89144 | 4/1993 |
| JP | 10-254962 | 9/1998 |
| JP | 11-213035 | 8/1999 |
| JP | 2004-178309 | 6/2004 |
| JP | 2005-11278 | 1/2005 |
| JP | 2006-126898 | 5/2006 |
| JP | 2007-188142 | 7/2007 |
| JP | 2007-188144 | 7/2007 |
| JP | 2007-188145 | 7/2007 |

OTHER PUBLICATIONS

Office Action issued Apr. 26, 2011, in Japan Patent Application No. 2006-236728.

* cited by examiner

*Primary Examiner* — Thomas Dixon

(74) *Attorney, Agent, or Firm* — Oblon, Spivak, McClelland, Maier & Neustadt, L.L.P.

(57) ABSTRACT

A workflow management system for managing a workflow including plural tasks is disclosed that includes a task data storing part for storing task data and a task control part for obtaining task data from the task data storing part, calculating a predetermined index from the task data, and outputting an evaluation of the workflow based on the result of the calculation.

20 Claims, 20 Drawing Sheets

FIG.10
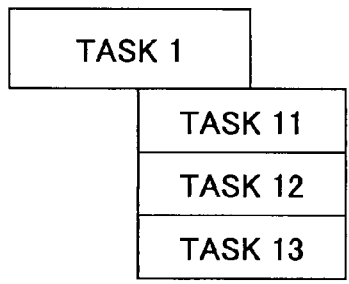
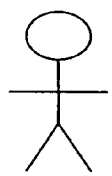
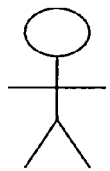
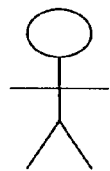
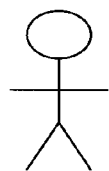
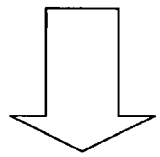
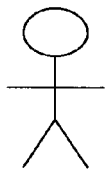
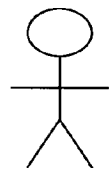
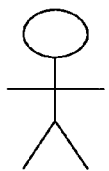
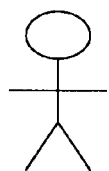

FIG.17
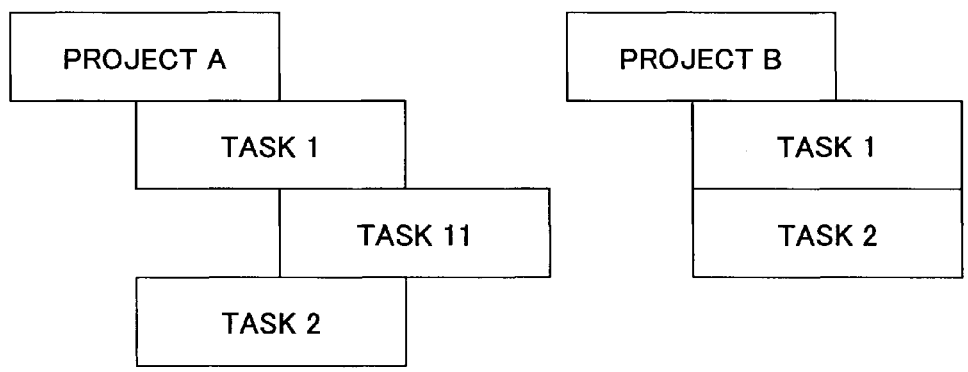
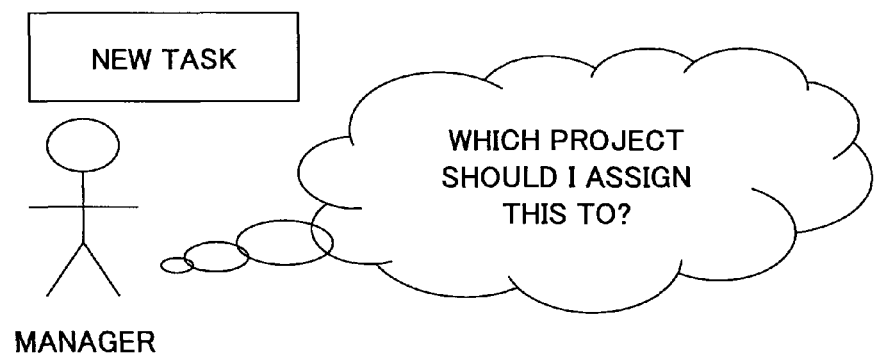

WORKFLOW MANAGEMENT INCLUDING DETERMINATION IF A REQUESTOR IS IN CHARGE OF TASKS

BACKGROUND OF THE INVENTION

1. Field of the Invention

The present invention relates to a workflow management system and a workflow management method, and more particularly to a workflow management system and a workflow management method for managing a workflow having multiple tasks by using a predetermined index.

2. Description of the Related Art

In recent years and continuing, methods of evaluating/improving business activities by using a performance evaluation index (indices) have become well-known. For example, Japanese Laid-Open Patent Application No. 2004-178309 discloses a method that allows performance evaluation to be visually comprehended at a given timing. As another example, Japanese Laid-Open Patent Application No. 2005-011278 discloses a method that allows a calculation index to be flexibly changed according to the needs of the user.

Furthermore, in recent years and continuing, a workflow is often used by companies and the like in order to manage the steps of a project. Here, the term "project" refers to an activity conducted by forming a team for a certain period of time for achieving an objective. In using a workflow, the steps of a project are managed by using tasks.

In a workflow management system that manages steps of a project by using tasks, registered tasks are managed by forming a tree structure. A task can be divided into sub-tasks for achieving the same objective. Furthermore, in a workflow management system, not only can an arbitrary task(s) or a sub-task(s) be designated to establish a parent-child relationship but can also be designated to conform to a sequential relationship so that, for example, one task or sub-task cannot be started unless another task or sub-task is completed.

Under these circumstances, although companies and the like have a desire to conduct project management efficiently by using a performance evaluation index (indices), such desire is not yet achieved. It is, however, rather common to perform an evaluation of a project by using performance evaluation indices.

In project management, even if there is a need to make modifications that affect the entire process, changing the tasks of a fixed type workflow is difficult. Therefore, it is difficult to perform an evaluation of a project (project management) in a case where a task(s) of a fixed type workflow is changed.

Meanwhile, tasks of a workflow can be changed relatively easily by using an AKW (Agile Knowledge Workflow) method. The AKW method allows a workflow to be conducted while also allowing parts of the workflow to be broken down into smaller tasks (recursive dividing into sub-tasks) by adding or deleting sub-tasks (child tasks), to thereby enable control of the flow of the workflow based on parent-child relationships or sequential relationships between the tasks of the workflow.

Nevertheless, even in a case where a workflow using the AKW method is used, it is difficult for a manager of a project to have continuous knowledge of the status of the project. Even if the manager has continuous knowledge of the status of the project, it is still difficult to modify of the project. Therefore, such modification is often decided by relying on experience.

SUMMARY OF THE INVENTION

The present invention may provide a workflow management system and a workflow management method that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a workflow management system and a workflow management method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a workflow management system for managing a workflow including plural tasks, the workflow management system including: a task data storing part for storing task data; and a task control part for obtaining task data from the task data storing part, calculating a predetermined index from the task data, and outputting an evaluation of the workflow based on the result of the calculation.

Furthermore, another embodiment of the present invention provides a workflow management method for managing a workflow including plural tasks, the workflow management method including the steps of: a) obtaining task data stored in a task data storing part; and b) calculating a predetermined index from the obtained task data; and c) outputting an evaluation of the workflow based on the result of the calculation.

Other objects and further features of the present invention will be apparent from the following detailed description when read in conjunction with the accompanying drawings.

BRIEF DESCRIPTION OF THE DRAWINGS

FIG. 10 is a schematic diagram for describing a usage case according to the third embodiment of the present invention;

FIG. 17 is a schematic diagram for describing a usage example according to the fourth embodiment of the present invention;

DESCRIPTION OF THE PREFERRED EMBODIMENTS

In the following, embodiments of the present invention will be described with reference to the accompanying drawings.
<System Configuration>

Figure 1:
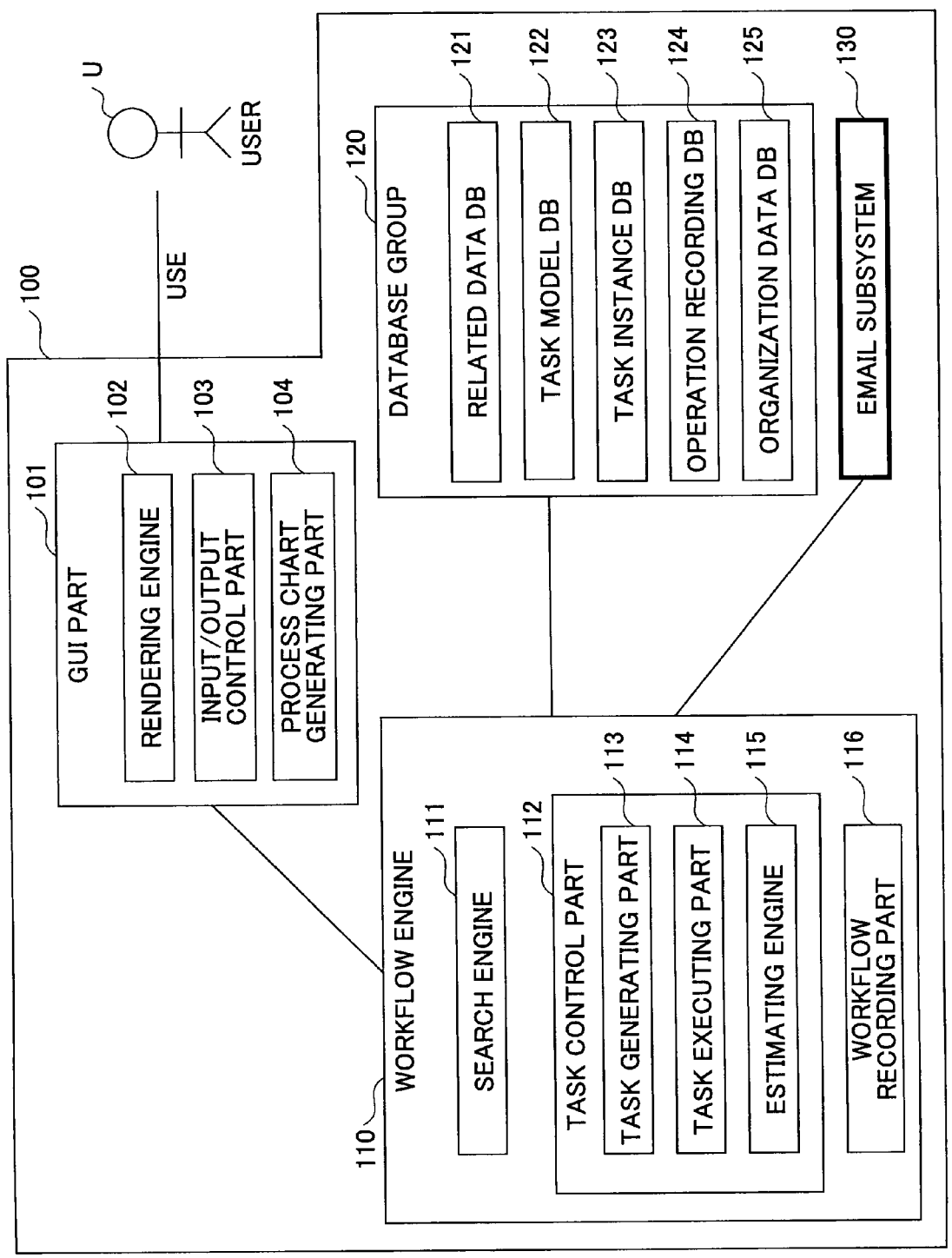
FIG. 1 is a schematic diagram showing an exemplary configuration of a workflow management system according to an embodiment of the present invention.

FIG. 1 is a schematic diagram showing an exemplary configuration of a workflow management system 100 according to an embodiment of the present invention. The workflow management system 100 includes a GUI part 101, a workflow engine 110, a database group 120, and an E-mail sub-system 130.

The GUI part 101 is for providing a GUI (Graphical User Interface) to a user U using the workflow management system 100 by operating a user terminal (not shown).

The workflow engine 110 is for dynamically generating and executing a workflow model by reusing an existing task model and/or a task instance. The database group 120, which includes one or more databases (DBs), is for systematically managing various data. The E-mail sub-system 130 is for performing various processes on E-mail.

The GUI part 101 includes a rendering engine 102, an input/output control part 103, and a process chart generating part 104. The rendering engine 102 is for rendering (depicting) a display screen. The input/output control part 103 is for exchanging information between the user U operating the user-terminal. The process chart generating part 104 is for generating a process chart.

The workflow engine 110 includes a search engine 111, a task control part 112, and a workflow recording part 116. The search engine 111 is for performing various searches on the database group 120. The task control part 112 is for controlling the tasks included in a workflow. The workflow recording part 116 is for recording operations (operations data) of a workflow in an operation recording DB 124 (described below) by referring to the database group 120 and monitoring actions between the user-terminal of the user U and the workflow management system 100.

The task control part 112 includes a task generating part 113, a task executing part 114, and an estimating engine 115. The task generating part 113 is for generating tasks. The task executing part 114 is for executing the generated tasks. The estimating engine 115 is for estimating the current task of the user U based on the data of the operation recording DB 124 and searching for related data in the database group 120.

The database group 120 includes a related data DB 121, a task model DB 122, a task instance DB 123, the operation recording DB 124, and an organization data DB 125. The related data DB 121 is for storing related data which are referred to when executing a workflow. The task model DB 122 is for storing task models that are abstracted beforehand by a manager, for example.

The task instance DB 123 is for storing task instances occurring in the past. The operation recording DB 124 is for storing operations recordings of a workflow. The organization data DB 125 is for storing organization data of a company or the like. It is to be noted that the task model DB 122 and the task instance DB 123 are linked to the data stored (registered) in the related data DB 121.

As an example of operations of the workflow management system 100, the user U operates the workflow engine 110 by using the user-terminal via the input/output control part 103 of the GUI part 101 to perform operations such as generating a workflow, executing the workflow, generating a workflow model, registering (storing) related data, and linking these operations together with a workflow instance and/or a workflow model.

In generating a workflow, the search engine 111 of the workflow engine 110 performs various searches on the database group 120. The task control part 112 of the workflow engine 110 uses the task model DB 122 and the task instance DB 123 and controls tasks of the workflow according to, for example, instructions from the user U.

The task generating part 113 of the task control part 112 performs, for example, an operation of generating tasks based on data of the database group 120 according to instructions from the user U or an operation of linking various data. The task executing part 114 uses the data of the task instance DB 123 according to instructions from the user U and updates task data. From the viewpoint of the workflow management system, execution of a task means updating of task data.

The estimating engine 115 estimates the current task of the user U based on data of the operation recording DB 124 and searches for related data in the database group 120. The workflow recording part 116 monitors actions between the user U and the workflow management system 100 and stores operation recordings of the workflow in the operation recording DB 124.

The workflow management system 100 is realized by using, for example, a personal computer (PC). Unless otherwise described, processes and operations of the workflow management system 100 according to the below-described embodiments of the present invention are executed by, for example, a CPU using a RAM as its main memory in accordance with a program stored in a ROM or a hard disk apparatus.

The below-described first through fourth embodiments of the present invention are examples of efficiently conducting project management using performance evaluation indices with the workflow management system 100 shown in FIG. 1. The workflow management system 100 according to an embodiment of the present invention defines a performance evaluation index (indices) based on task data and calculates the actual performance evaluation index from the task data. Different messages are automatically reported to the user U according to the calculation result. That is, the workflow management system 100 explicitly indicates support data to the user U.

By using a workflow of the AKW method, the workflow management system 100 can easily change tasks of the workflow. Furthermore, the workflow management system 100 can conduct project management using the AKW method based on the performance evaluation index.

First Embodiment

The workflow management system 100 according to the first embodiment of the present invention (hereinafter also simply referred to as "workflow management system 100 according to the first embodiment") uses discrepancy of plans of a project as a performance evaluation index. The discrepancy of plans of a project is defined as the below-described Formula 1 which expresses the difference between the expected (estimated) number of days for completing the tasks of an entire project and the actual number of days spent for completing the tasks of the entire project. In Formula 1, the performance evaluation index is expressed with a KPI (Key Performance Indicator).

[Formula 1]

$$KPI = \sum_{i=0}^{n} |date_i^{pref} - date_i^{tar}| \quad (1)$$

In Formula 1, "n" indicates the number of tasks, "$date^{pref}$" indicates the expected date of completion, and "$date^{tar}$" indicates the actual date of completion.

Formula 1 is not limited to being applied to the tasks of the entire project but may also be applied to a sub-tree having a given task as its root. The workflow management system 100 according to the first embodiment can arbitrarily calculate Formula 1. The workflow management system 100 according to the first embodiment can release some kind of warning in a case where the calculation result is greater than a threshold. Not only can the workflow management system 100 according to the first embodiment conduct calculation by using Formula 1 at a given time but may also automatically conduct the calculation and release a warning according to the calculation result.

Next, exemplary cases of using the workflow management system 100 according to the first embodiment are described with Usage Example 1 and Usage Example 2.

Usage Example 1

Figure 2:
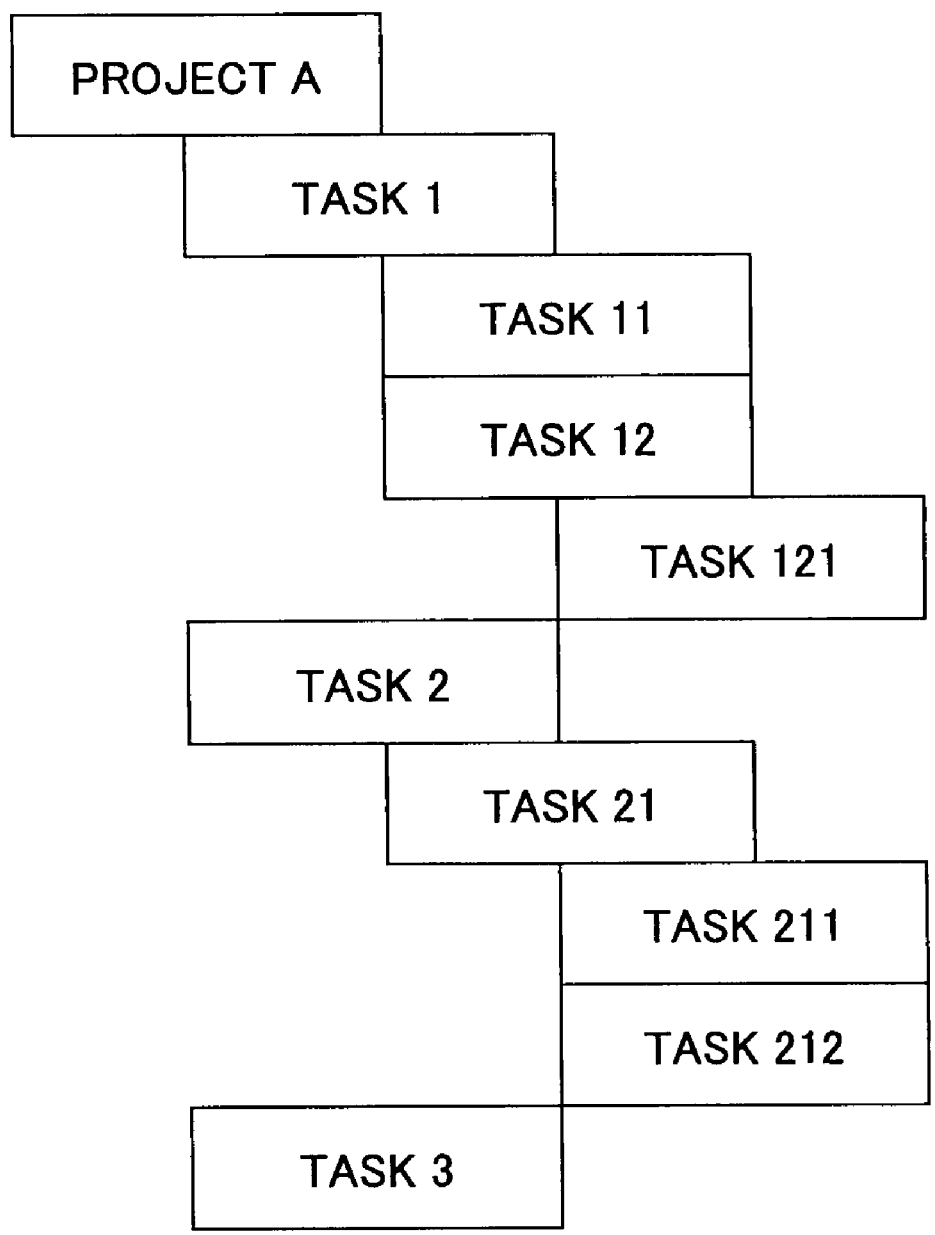
FIG. 2 is a schematic diagram for describing a usage example according to the first embodiment of the present invention.

In a Project A having plural tasks as shown in FIG. 2, the person responsible for Task 1 calculates a discrepancy of plans in order to know the status of the entire Project A or the status of part of Project A. In a case where the discrepancy of plans exceeds a threshold, the workflow management system 100 according to the first embodiment releases a warning together with the calculation result. The workflow management system 100 according to the first embodiment can prompt change of a task(s) to the user by displaying a task(s) having a high discrepancy of plans on the user-terminal.

Usage Example 2

Figure 3:
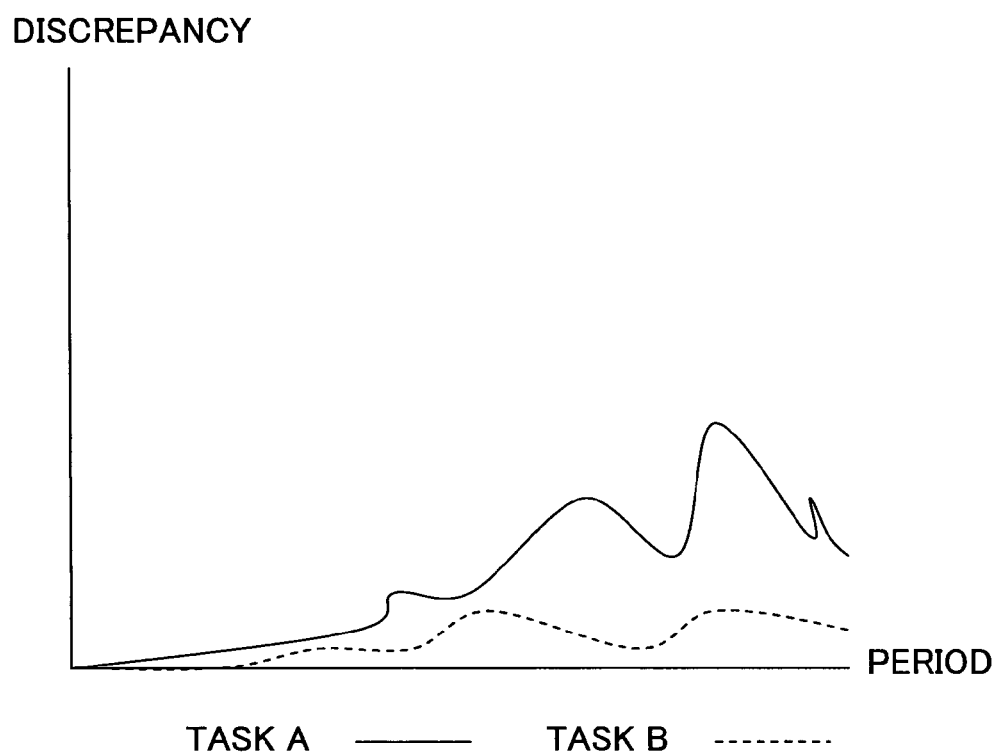
FIG. 3 is another schematic diagram for describing a usage example according to the first embodiment of the present invention.

In another Project A as shown in FIG. 2, the person responsible for Task 1 included in Project A may search for a task similar to Task 1 by searching through, for example, past data in a database or a registered (stored) library and display transactions of the discrepancies corresponding to the tasks (in this example, "Task A" and "Task B") that are similar to Task 1 as shown in FIG. 3.

In Usage Example 2, the transition of discrepancy of plans is used as an index for determining which task should be referred to. In FIG. 3, Task B having less discrepancy than that of Task A should be referred to.

Figure 4:
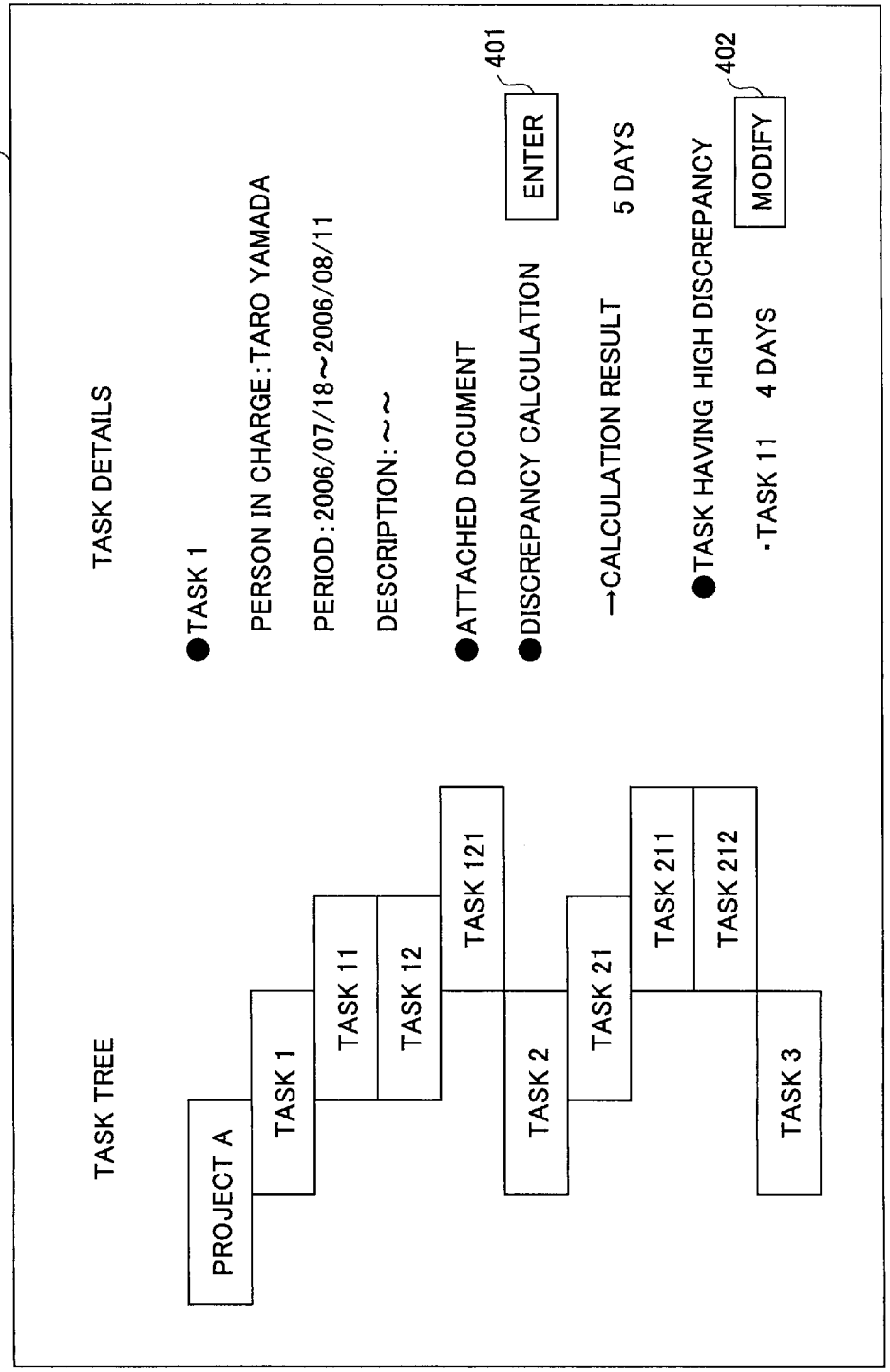
FIG. 4 is a schematic diagram showing an input/output screen displayed on a user-terminal according to the workflow management system according to the first embodiment of the present invention.

FIG. 4 is a schematic diagram showing an input/output screen 400 displayed on a user-terminal according to the workflow management system according to the first embodiment. In the input/output screen 400 shown in FIG. 4, a task tree is displayed on the left side of the screen while details of tasks are displayed on the right side of the screen. For example, the task tree of Project A is shown on the left side of the screen. The details of tasks displayed on the right side of the screen include, for example, task data corresponding to "Task 1" selected from the task tree, attached documents, the results of calculating the discrepancy of plans for a part of or all of the tasks of Project A (in this example, "5 days"), the task having high discrepancy of plans (in this example, "Task 11"), and the results of calculating the discrepancy of plans for the task having high discrepancy (in this example, "4 days").

When the person responsible for "Task 1" clicks or presses the "enter" button, the workflow management system 100 according to the first embodiment executes calculation of the discrepancy of plans for a part of or all of the tasks of Project A. When the person responsible for "Task 1" clicks or presses the "modify" button, the workflow management system 100 according to the first embodiment changes the screen to a screen (not shown) used for modifying the task having high discrepancy of plans (in this example, "Task 11").

Next, processes of the workflow management system 100 in a case where "enter" is clicked or pressed by the person responsible for "Task 1" are described with reference to the sequence diagram shown in FIG. 5.

Figure 5:
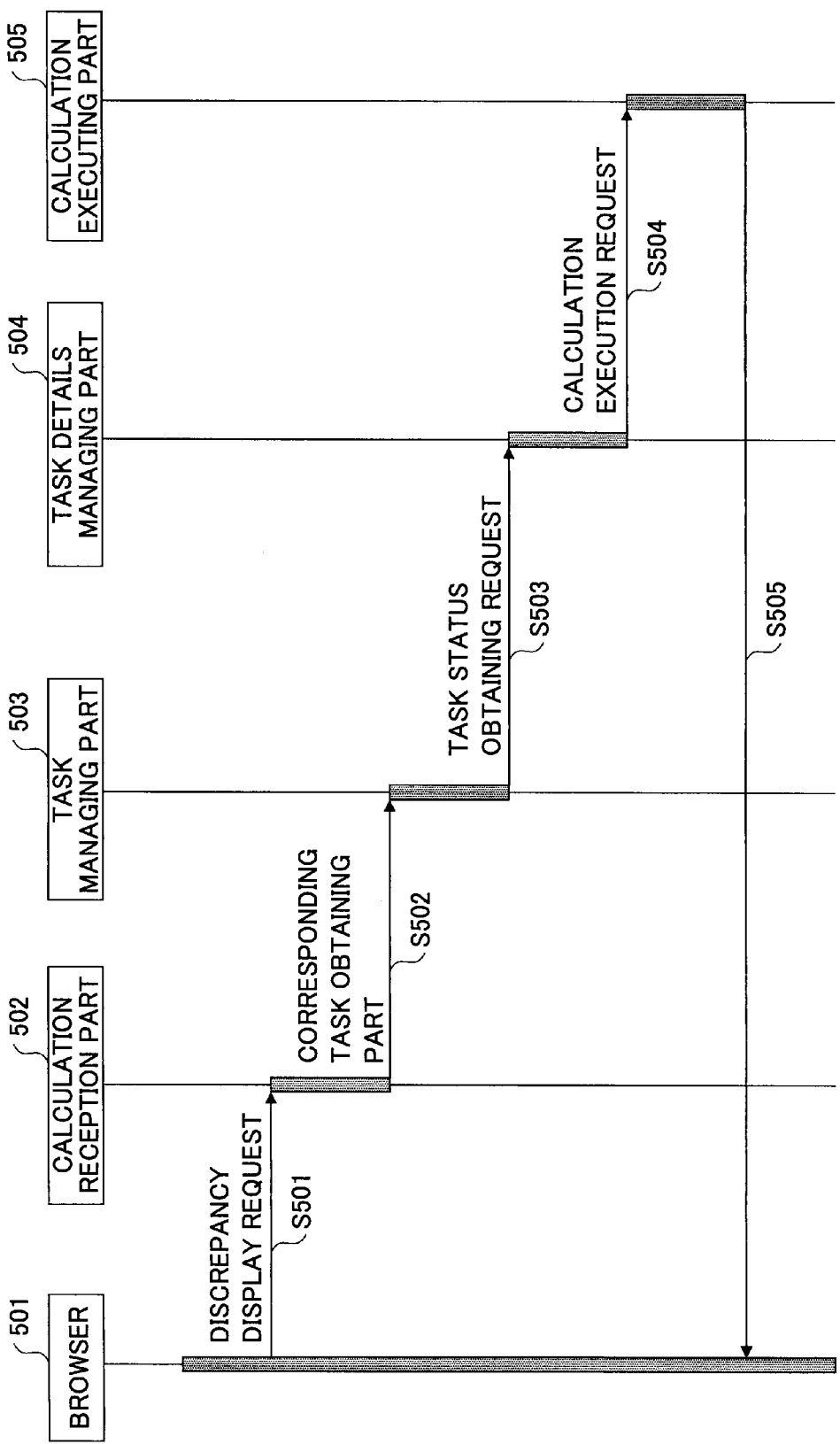
FIG. 5 is a sequence diagram showing a process of calculating discrepancy of plans with the workflow management system according to the first embodiment of the present invention.

FIG. 5 is a sequence diagram showing a process of calculating discrepancy of plans with the workflow management system according to the first embodiment.

It is to be noted that a browser 501 shown in FIG. 5 is installed in the user-terminal. Furthermore, a calculation reception part 502, a task managing part 503, a task details managing part 504, and a calculation executing part 505 are controlled by the workflow management system 100.

First, the browser 501 installed in the user-terminal sends a request for displaying discrepancy (discrepancy display request) to the calculation reception part 502 of the workflow management system 100 when the "enter" button 401 of the input/output screen 400 is clicked or pressed (Step S501). Then, the calculation reception part 502 designates a task selected by the user U based on the discrepancy display request and sends a request for obtaining a corresponding task (corresponding task obtaining request) (Step S502).

Then, the task managing part 503 selects a task necessary for displaying discrepancy of plans based on the corresponding task obtaining request and obtains the selected task. The task managing part 503 also designates the task necessary for displaying discrepancy of plans and sends a request for obtaining task status of the designated task (task status obtaining request) to the task details managing part 504 (Step S503).

Then, in accordance with the task status obtaining request, the task details managing part 504 obtains the task status of the task designated by the task managing part 503. The task details managing part 504 designates the obtained task status and sends a request for executing calculation of discrepancy of plans (calculation execution request) to the calculation executing part 505 (Step S504).

Then, the calculation executing part 505 calculates discrepancy of plans based on the designated task status and sends the calculation result to the browser 501 as a response corresponding to the discrepancy display request (S505).

Figure 6:
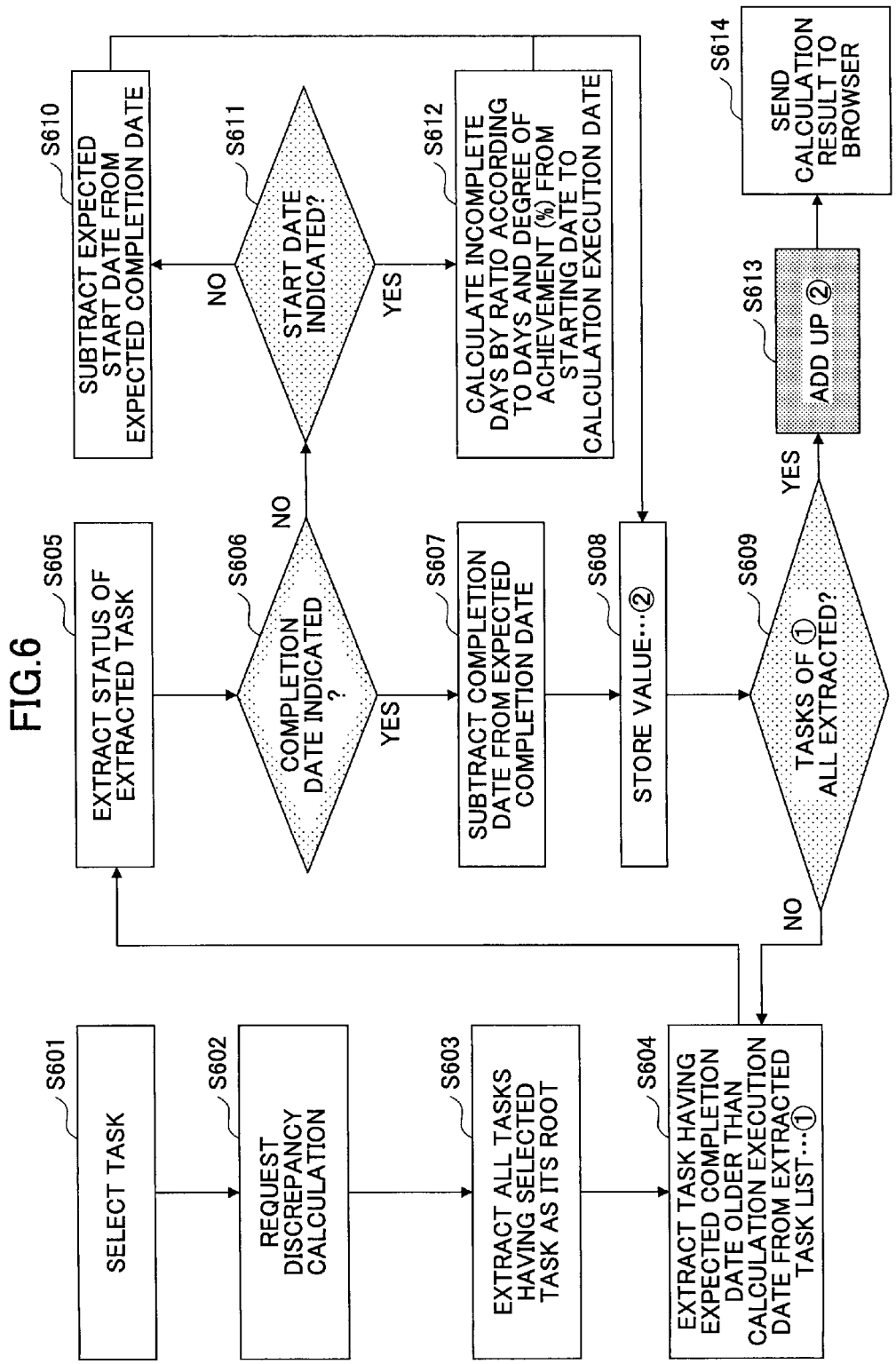
FIG. 6 is a flowchart showing an exemplary process of calculating discrepancy of plans according to an embodiment of the present invention.
Figure 7:
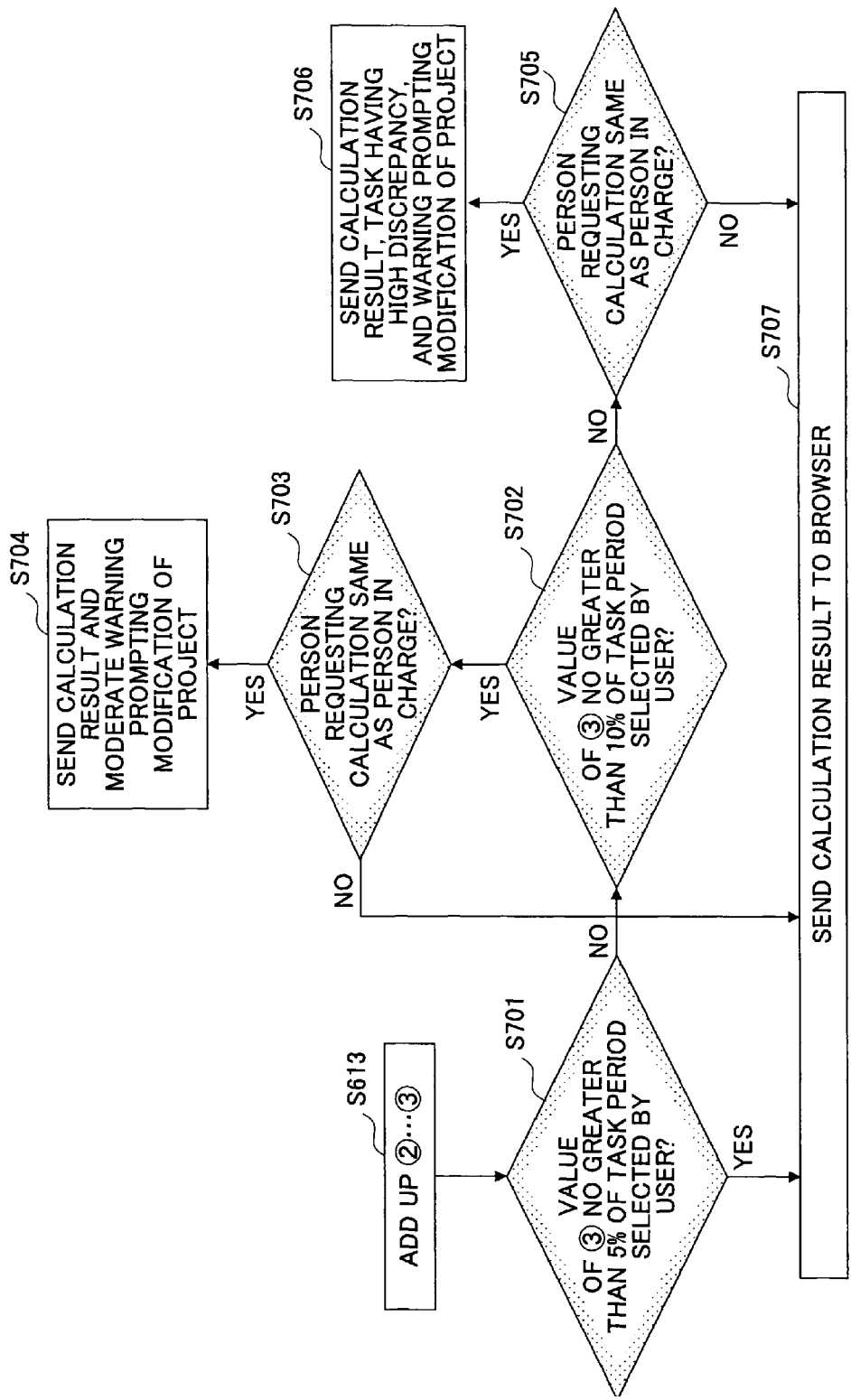
FIG. 7 is a flowchart showing an exemplary process of generating support data according to an embodiment of the present invention.

Next, a process of calculating discrepancy of plans and a process of generating support information (support data) with the workflow managing system 100 according to the first embodiment are described in detail. FIG. 6 is a flowchart showing an exemplary process of calculating discrepancy of plans according to an embodiment of the present invention. FIG. 7 is a flowchart showing an exemplary process of generating support data according to an embodiment of the present invention.

First, a user selects a given task from a task tree displayed on the input/output screen (see FIG. 4) of the browser 501 (Step S601). Then the browser 501 requests calculation of discrepancy (discrepancy calculation request) with respect to a sub-tree having the task selected by the user as its root (Step S602).

Then, the task managing part 503 receives the discrepancy calculation request from the browser 501 via the calculation reception part 502 and extracts all of the tasks included in the sub-tree having the task selected by the user as its root (Step S603).

Then, the task managing part 503 extracts the tasks listed in a task list indicating all of the tasks extracted in Step S603 (Step S604). In Step S604, the tasks are extracted one by one in an order beginning from a task having an expected (estimated) completion date that is older than the date of executing the discrepancy calculation. Then, the task details managing part 504 extracts status (task status) corresponding to the extracted task extracted in Step S604 (Step S605).

Then, the calculation executing part 505 determines whether a completion date is indicated in the task status extracted in Step S605 (Step S606). In a case where the completion date is indicated in the task status (Yes in Step S606), the calculation executing part 505 subtracts the completion date from the expected completion date (Step S607). Then, the calculation executing part 505 stores the number of days (value) obtained by subtracting the completion date from the expected completion date into, for example, a memory (Step S608).

Meanwhile, in a case where the completion date is not indicated in the task status (No in Step S606), the calculation executing part 505 determines whether a starting date is indicated. In a case where the starting date is not indicated, the calculation executing part 505 subtracts the expected (estimated) starting date from the expected (estimated) completion date (Step S610). Then, the calculation executing part 505 stores the number of days (value) obtained by subtracting the expected starting date from the expected completion date into, for example, a memory (Step S608).

In a case where the starting date is indicated, the calculation executing part 505 calculates (by ratio) the number of days that are incomplete (unfinished) according to the days and degree of achievement (%) starting from the starting date to the calculation execution date (Step S612). The calculation executing part 505 stores the calculated number of incomplete days into, for example, a memory (Step S608).

The process including Steps S604-S608 is repeated until all of the tasks listed in the task list indicating all of the tasks to be extracted in Step S603 are extracted in Step S604. When all of the tasks listed in the task list indicating all of the tasks extracted in Step S603 are extracted in Step S604, the calculation executing part 505 adds up the number of days stored in Step S608 (Step S613). Then, the calculation executing part 505 sends the number of days added in Step S613 to the browser 501 as the calculation result (Step S614).

As shown in the flowchart of FIG. 7, the workflow management system 100 can present support data to the user by sending different messages to the browser 501 in accordance with the calculation result.

After the number of days stored in Step S608 is added up in Step S613, the calculation executing part 505 determines whether the days added up in Step S613 are no greater than 5% of a task period selected by the user U (S701).

In a case where the days added up in Step S613 are no greater than 5% of the task period selected by the user U, the calculation executing part 505 sends the days added up in Step S613 as the calculation result to the browser 501 (Step S707). In a case where the days added up in Step S613 are greater than 5% of the task period selected by the user U, the calculation executing part 505 determines whether the days added up in Step S613 are no greater than 10% of a task period selected by the user U (Step S702).

In a case where the days added up in Step S613 are no greater than 10% of the task period selected by the user U, the calculation executing part 505 determines whether the person requesting the calculation is the person in charge of the project (Step S703). In a case where the person requesting the calculation is the person in charge of the project, the calculation executing part 505 sends the calculation result of adding up the number of days in Step S613 to the browser 501 together with a trivial warning for prompting the user U to modify the project (S704).

In a case where the days added up in Step S613 are greater than 10% of the task period selected by the user U, the calculation executing part 505 determines whether the person requesting the calculation is the person in charge of the project (Step S705).

In a case where the person requesting the calculation is the person in charge of the project, the calculation executing part 505 sends the calculation result of adding up the number of days in Step S613 to the browser 501 together with data of a task having high discrepancy of plans, and a warning for prompting the user U to modify the project (S706). In a case where the person requesting the calculation is not the person in charge of the project, the calculation executing part 505 sends the calculation result of adding up the number of days in Step S613 to the browser 501 (Step S707).

With the workflow management system 100 according to the first embodiment, a project can be efficiently managed by using discrepancy of plans.

Second Embodiment

The workflow management system 100 according to the second embodiment of the present invention (hereinafter also simply referred to as "workflow management system 100 according to the second embodiment") uses delay of plans of a project as a performance evaluation index. The delay of plans of a project is defined as the below-described Formula 2 which expresses the difference between number of days required for completing the tasks of an entire project and the actual number of days spent for completing the tasks of the entire project. In Formula 2, the performance evaluation index is expressed with a KPI (Key Performance Indicator).

[Formula 2]

$$KPI = \sum_{i=0}^{n} \left( \text{date}_i^{pref} - \text{date}_i^{tar} \right) \quad (2)$$

In Formula 2, "n" indicates the number of tasks, "date$^{pref}$" indicates the expected date of completion, and "date$^{tar}$" indicates the actual date of completion.

Formula 2 is not limited to being applied to the tasks of the entire project but may also be applied to a sub-tree having a given task as its root. The workflow management system 100 according to the second embodiment can arbitrarily calculate Formula 2. The workflow management system 100 according to the second embodiment can release some kind of warning in a case where the calculation result is a negative value (minus value) and at the same time no less than a threshold. Not only can the workflow management system 100 according to the second embodiment conduct calculation by using Formula 2 at a given time but may also automatically conduct the calculation and release a warning according to the calculation result.

Next, exemplary cases of using the workflow management system 100 according to the second embodiment are described with the following Usage Example.

Usage Example

In a Project A having plural tasks as shown in FIG. 2, the person responsible for Task 1 calculates a delay of plans in order to know the status of the entire Project A or the status of part of Project A.

In a case where the delay of plans is a negative value and at the same time exceeds a threshold, the workflow management system 100 according to the second embodiment releases a warning together with the calculation result. The workflow management system 100 according to the second embodiment can prompt change of a task(s) or deletion of a task(s) to the user by displaying a task(s) having a low priority on the user-terminal.

Figure 8:
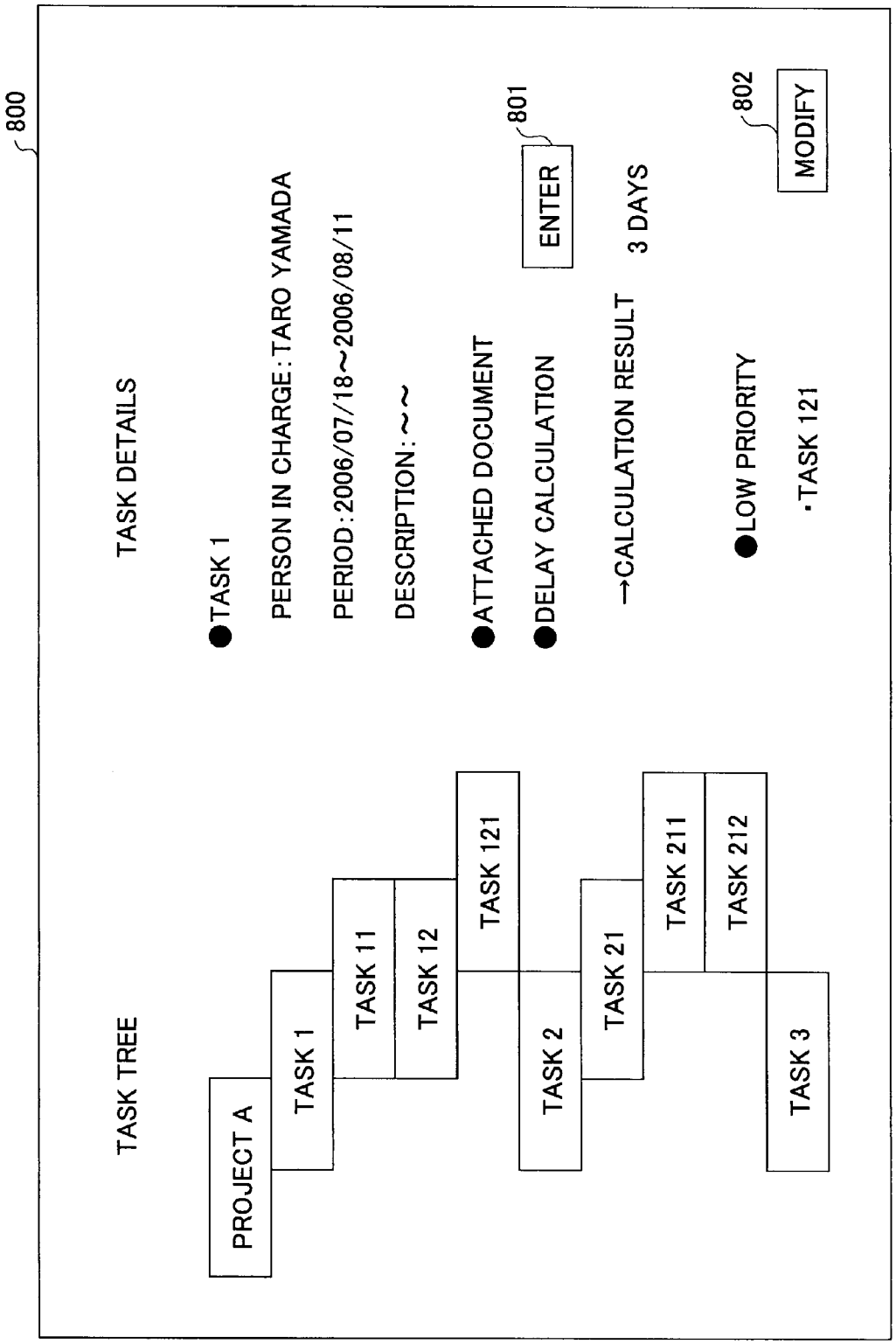
FIG. 8 is a schematic diagram showing an input/output screen displayed on a user-terminal according to the workflow management system according to the second embodiment of the present invention.

FIG. 8 is a schematic diagram showing an input/output screen 800 displayed on a user-terminal according to the workflow management system according to the second embodiment. In the input/output screen 800 shown in FIG. 8, a task tree is displayed on the left side of the screen while details of tasks are displayed on the right side of the screen. For example, the task tree of Project A is shown on the left side of the screen. The details of tasks displayed on the right side of the screen include, for example, task data corresponding to "Task 1" selected from the task tree, attached documents, the results of calculating the delay of plans for a part of or all of the tasks of Project A (in this example, "3 days"), and the task having low priority (in this example, "Task 121").

When the person responsible for "Task 1" clicks or presses the "enter" button 801, the workflow management system 100 according to the second embodiment executes calculation of the delay of plans for a part of or all of the tasks of Project A.

When the person responsible for "Task 1" clicks or presses the "modify" button 802, the workflow management system 100 according to the second embodiment changes the screen to a screen (not shown) used for modifying the task having low priority (in this example, "Task 121").

Since the use of "delay" instead of "discrepancy" is the only difference between operation of the workflow management system 100 according to the second embodiment in the case where the enter button 801 is clicked or depressed by the person responsible for "Task 1" and the operation illustrated with the sequence diagram of FIG. 5, description of the operation of the workflow management system 100 according to the second embodiment is omitted. Furthermore, since the use of "delay" instead of "discrepancy" is the only difference between the process of calculating delay of plans and the process of calculating discrepancy of plans, description of the process of calculating delay of plans is omitted.

Figure 9:
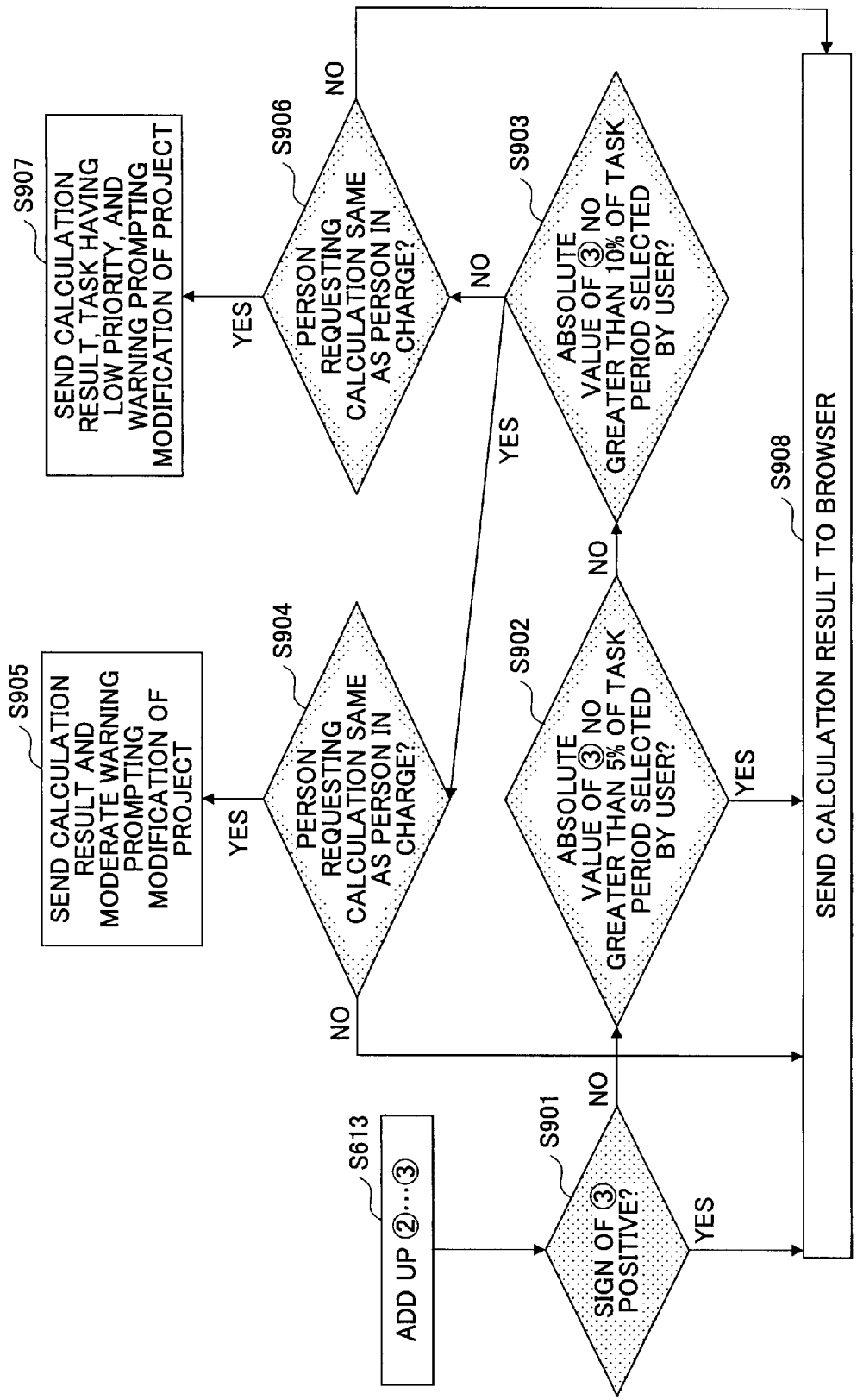
FIG. 9 is a flowchart showing an exemplary process of generating support data according to an embodiment of the present invention.

Next, a process of generating support information (support data) with the workflow managing system 100 according to the second embodiment is described in detail. FIG. 9 is a flowchart showing an exemplary process of generating support data according to an embodiment of the present invention. The workflow management system 100 according to the second embodiment can explicitly indicate support data to the user U by sending different messages to the browser 501 according to calculation results.

After the number of days stored in Step S608 is added up in Step S613, the calculation executing part 505 determines whether the sum of days added up in Step S613 is a positive value (plus value) (Step S901). In a case where the symbol of the days added up in Step S613 expresses a positive value, the calculation executing part 505 sends the days added up in Step S613 as the calculation result to the browser 501 (Step S908). In a case where the days added up in Step S613 is not a positive value (plus value), the calculation executing part 505 determines whether the absolute value of the days added up in Step S613 is no greater than 5% of a task period selected by the user U (Step S902).

In a case where the absolute value of the days added up in Step S613 is no greater than 5% of the task period selected by the user U, the calculation executing part 505 sends the calculation result of adding up the number of days in Step S613 to the browser 501 (Step S908). In a case where the absolute value of the days added up in Step S613 is greater than 5% of the task period selected by the user U, the calculation execution part 505 determines whether the absolute value of the days added up in Step S613 is no greater than 10% of the task period selected by the user U (Step S903).

In a case where the absolute value of the days added up in Step S613 is no greater than 10% of the task period selected by the user U, the calculation executing part 505 determines whether the person requesting the calculation is the person in charge of the project (Step S904). In a case where the person requesting the calculation is the person in charge of the project, the calculation executing part 505 sends the calculation result of adding up the number of days in Step S613 to the browser 501 together with a moderate warning for prompting the user U to modify the project (Step S905). In a case where the person requesting the calculation is not the person in charge of the project, the calculation executing part 505 sends the calculation result of adding up the number of days in Step S613 to the browser 501 (Step S908).

In a case where the absolute value of the days added up in Step S613 is greater than 10% of the task period selected by the user U, the calculation execution part 505 determines whether the person requesting the calculation is the person in charge of the project (Step S906).

In a case where the person requesting the calculation is the person in charge of the project, the calculation executing part 505 sends the calculation result of adding up the number of days in Step S613 to the browser 501 together with a task having low priority, and a warning for prompting the user U to modify the project (Step S907). In a case where the person requesting the calculation is not the person in charge of the project, the calculation executing part 505 sends the calculation result of adding up the number of days in Step S613 to the browser 501 (Step S908).

With the workflow management system 100 according to the second embodiment, a project can be efficiently managed by using delay of plans.

Third Embodiment

The workflow management system 100 according to the third embodiment of the present invention (hereinafter also simply referred to as "workflow management system 100 according to the third embodiment") uses the proportion of the total time (person-day) required in completing a task(s) of a given member(s) within a given period as a performance evaluation index. The proportion of the total time (person-day) required in completing a task(s) of a given member(s) within a given period is defined as the below-described Formula 3. In Formula 3, the performance evaluation index is expressed with a KPI (Key Performance Indicator).

[Formula 3]

$$KPI = 100 \cdot \frac{s}{pd} \quad (3)$$

In Formula 3, "s" indicates the proportion of the total time (person-day) required in completing a task(s) of a given member(s) within a given period, and "pd" indicates the given period.

For example, the given period in Formula 3 may be the period between the calculation date and the expected project completion date. Furthermore, Formula 3 may not only be used for a single project but may also be used for plural projects. Furthermore, Formula 3 may be used only for designated members.

The same as the workflow management system 100 according to the first embodiment, the workflow management system 100 according to the third embodiment is described with a Usage Example.

Usage Example

In the usage example shown in FIG. 10, "Sub-task 11", "Sub-task 12", and "Sub-task 13" are added to "Task 1". After "Sub-task 11", "Sub-task 12", and "Sub-task 13" are transferred to corresponding members, a member to which person-hours (person-power) are concentrated KPI is calculated by using Formula 3. In a case where person-hours (person-power) are concentrated for a single person, the task(s) can be transferred to other available members having lesser person-hours.

Figure 11:
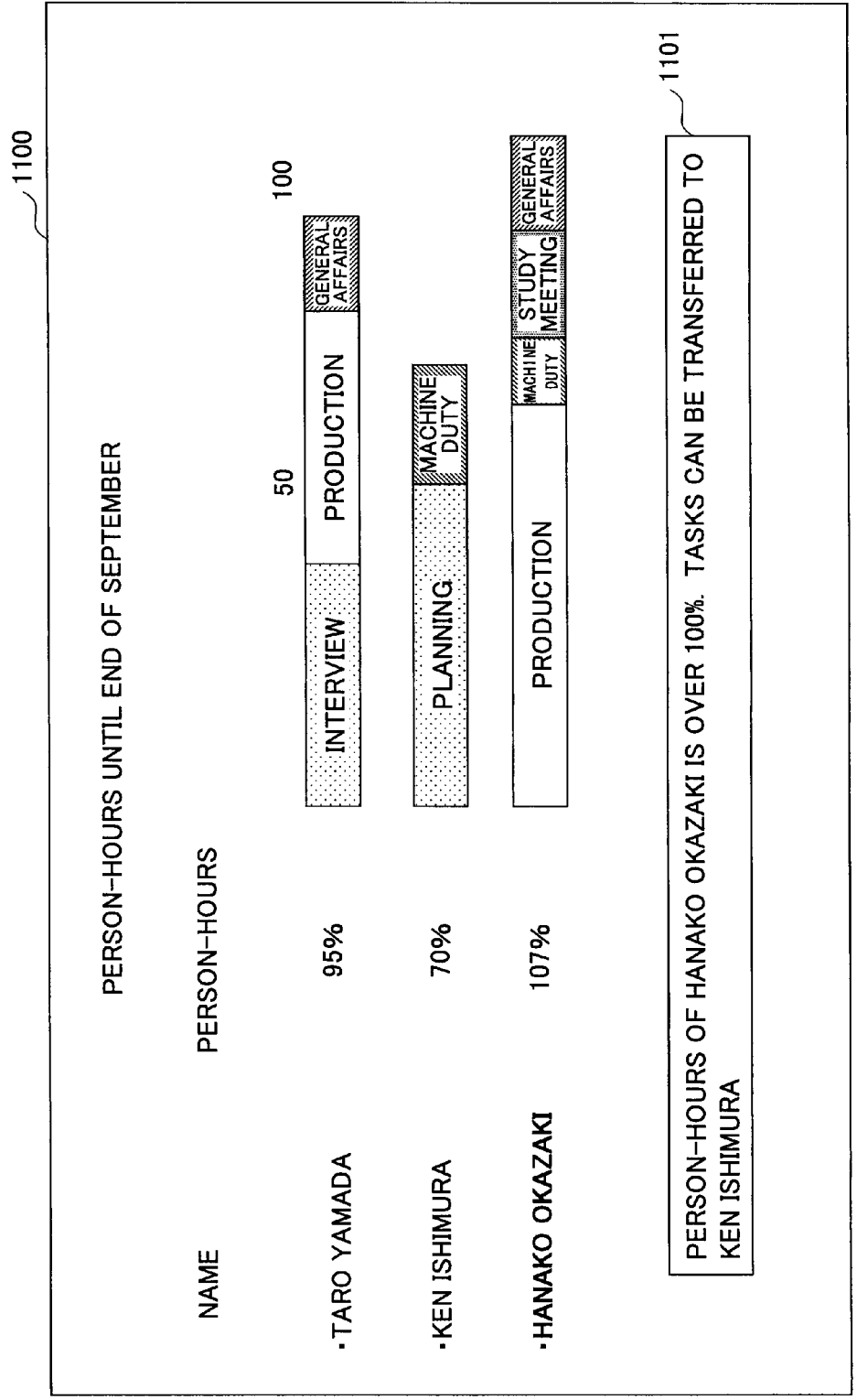
FIG. 11 is a schematic diagram showing an input/output screen displayed on a user-terminal according to the workflow management system according to the third embodiment of the present invention.

FIG. 11 is a schematic diagram showing an input/output screen 1100 displayed on a user-terminal according to the workflow management system according to the third embodiment. The input/output screen 1100 may display, for example, the names of members, person power (period) until the end of a month (in this example, the end of September), and the proportion of the total person-hours required in completing a task(s) for each member. For example, a member having the name "Taro Yamada" is in charge of the tasks "interview", "production", and "general affairs" until the end of September. The proportion of the total person-hours required in completing the tasks until the end of September for the member "Taro Yamada" is "95%".

Furthermore, a member having the name "Hanako Okazaki" is in charge of the tasks "production", "machine duty", "study meeting", and "general affairs" until the end of September. The proportion of the total person-hours required in completing the tasks until the end of September for the member "Hanako Okazaki" is "107%".

Since the person-hours of the member "Hanako Okazaki" until the end of September is over "100%", a message 1101 including a warning and a candidate for transferring a task is displayed on the input/output screen 1100.

Figure 12:
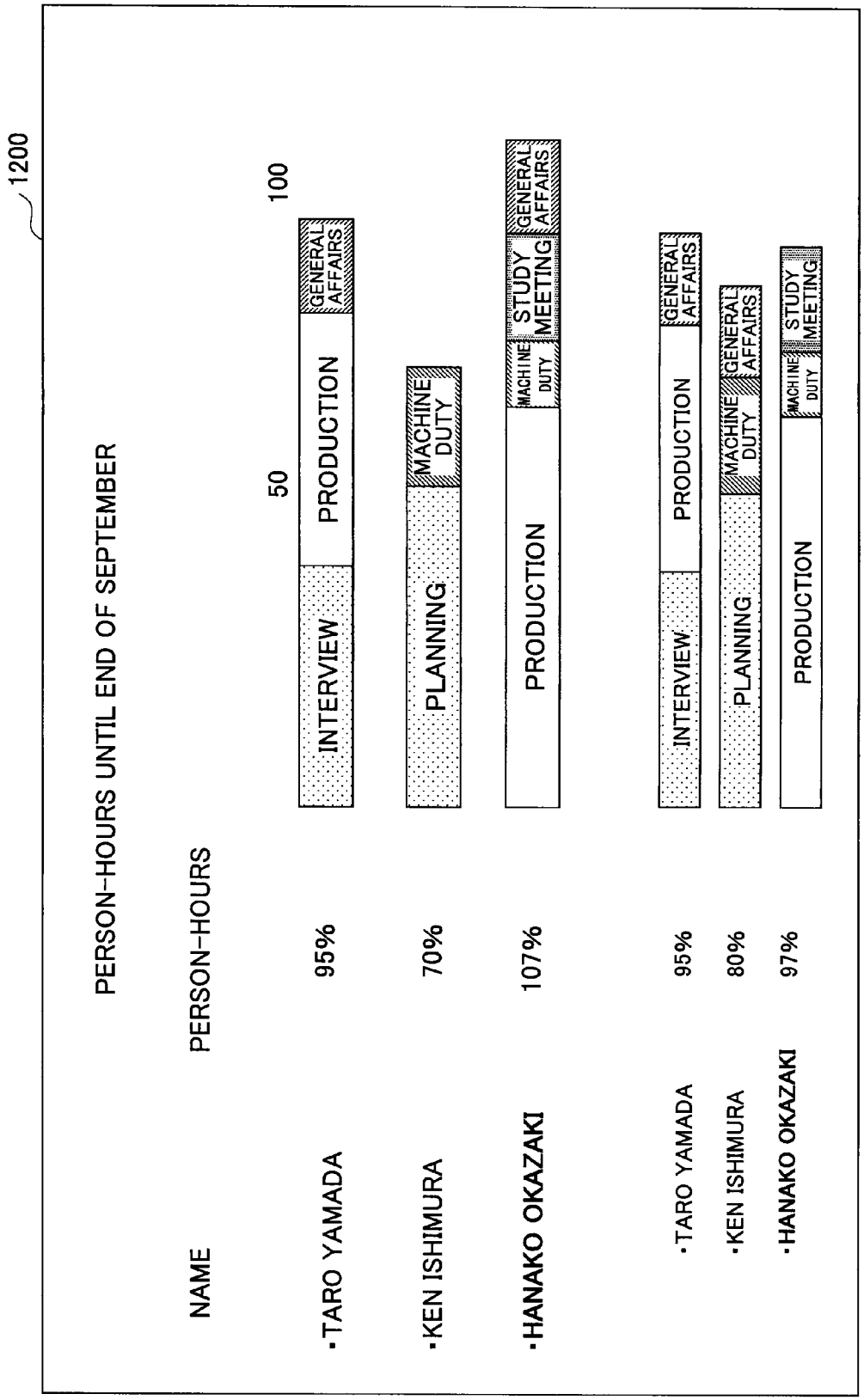
FIG. 12 is a schematic diagram showing another input/output screen displayed on a user-terminal according to the workflow management system according to the third embodiment of the present invention.

FIG. 12 is a schematic diagram showing another input/output screen 1200 displayed on a user-terminal according to the workflow management system according to the third embodiment. Instead of displaying the message 1101 on the input/output screen 1100 as in FIG. 11, the input/output screen 1200 may display the proportion of the total person-hours required in completing a task(s) for each member after a task(s) is transferred from one member to another.

Next, processes of the workflow management system 100 for displaying the input/output screen 1100 of FIG. 11 or the input/output screen 1200 of FIG. 12 on the browser 501 are described with reference to the sequence diagram shown in FIG. 13.

Figure 13:
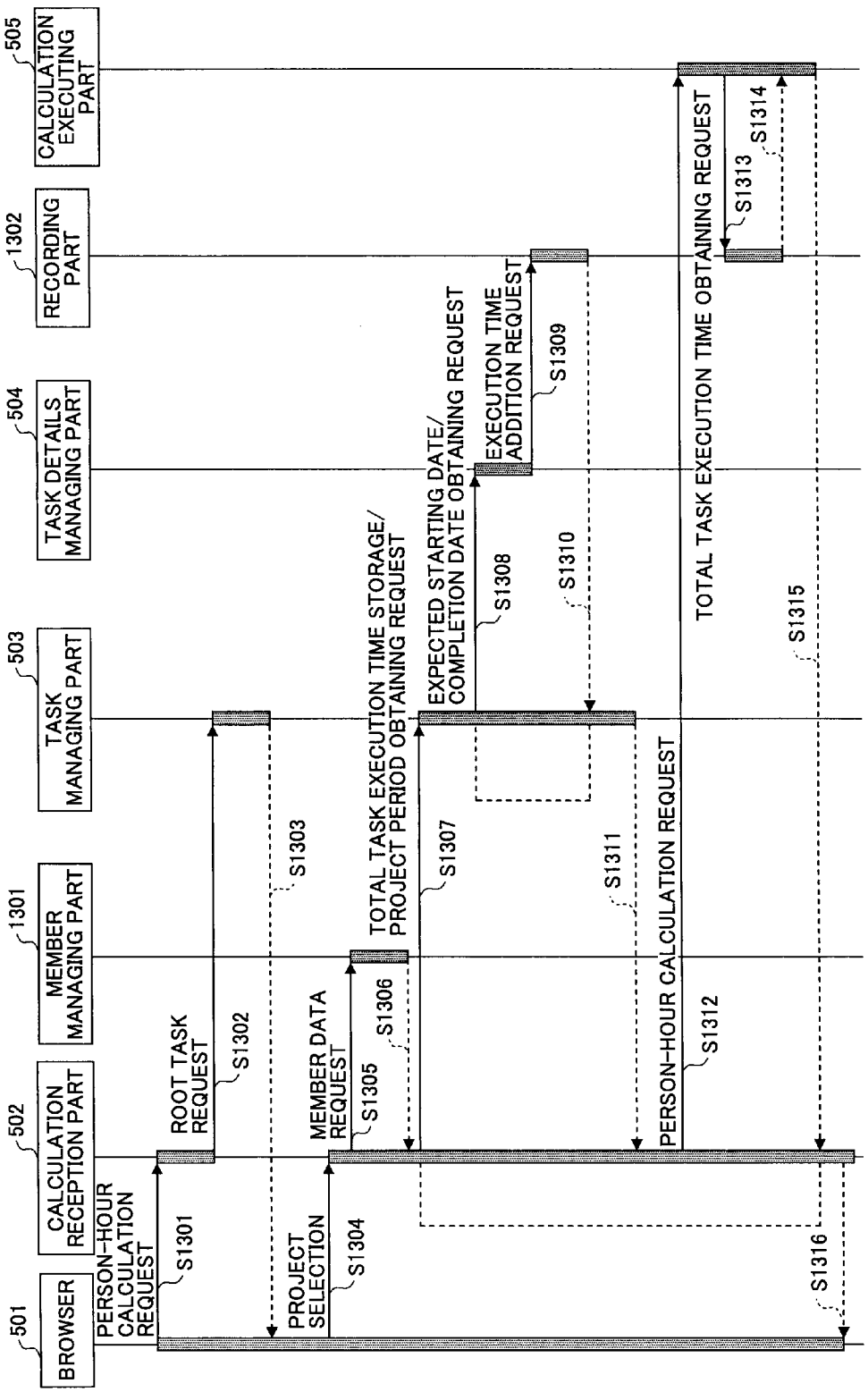
FIG. 13 is a sequence diagram showing a process of calculating busyness of a member(s) with the workflow management system according to the third embodiment of the present invention.

FIG. 13 is a sequence diagram showing a process of calculating busyness of a member(s) with the workflow management system according to the third embodiment.

It is to be noted that a browser 501 shown in FIG. 13 is installed in the user-terminal. Furthermore, a calculation reception part 502, a task managing part 503, a task details managing part 504, a calculation executing part 505, a member managing part 1301, and a recording part 1302 are controlled by the workflow management system 100.

First, the browser 501 installed in the user-terminal sends a request for calculating person-hours (person-hour calculation request) to the calculation reception part 502 of the workflow management system 100 in accordance with a request from the user U (Step S1301). The calculation reception part 502 sends a request for a root task (project) to the task managing part 503 based on the person-hour calculation request (Step S1302). The browser 501 obtains data of the root task (project) from the task managing part 503 (Step S1303). The browser 501 displays a screen (not shown) enabling a project to be selected by the user in accordance with the project data obtained from the task managing part 503. The browser 501 reports the project selected by user to the calculation reception part 502 (Step S1304).

The calculation reception part 502 designates the project selected by the user and sends a request for member data corresponding to the member(s) in charge of the designated project to the member managing part 1301 (Step S1305). Then, the calculation reception part 502 obtains the requested member data corresponding to the member(s) in charge of the designated project from the member managing part 1301 (Step S1306).

The calculation reception part 502 designates a given member(s) based on the obtained member data and sends a request for storing a total task execution time and obtaining a project period to the task managing part 503 (Step S1307).

The task managing part 503 sends a request for obtaining an expected starting/completion date of the task(s) which the given member is in charge of to the task details managing part 504 (Step S1308). The task details managing part 504 calculates the execution time based on the expected starting/completion date of the task(s) which the given member is in charge of and sends a request for adding and storing the calculated execution time (execution time addition request) to the recording part 1302 (Step S1309). After the recording part 1302 completes storing the execution time, the task managing part 503 receives a response from the recording part 1302 (Step S1310). The process including the Steps S1308-S1310 is repeated for a number of times equal to the number of tasks which the given member is in charge of.

After the process including the Steps S1308-S1310 is repeated for a number of times equal to the number of tasks which the given member is in charge of, the calculation reception part 502 receives a response from the task managing part 503. Then, the calculation reception part 502 sends a request for calculating person-hours of the given member to the calculation executing part 505 (Step S1312).

The calculation executing part 505 sends a request for obtaining the total task execution time (i.e. added execution time of the tasks which the given member is in charge of) to the recording part 1302 (Step S1313). Accordingly, the calculation execution part 505 obtains the total task execution time from the recording part 1302 (Step S1314). The calculation execution part 505 calculates the proportion of the total task execution time which the member is in charge of during the project period based on the obtained total task execution time and the project period and sends the calculation result to the calculation reception part 502 (Step S1315).

It is to be noted that the process including Steps S1307-S1315 is repeated for a number of times equal to the number of members in charge of the project. After the process including Steps S1307-S1315 is repeated for a number of times equal to the number of members in charge of the project, the calculation reception part 502 displays the proportion of the total execution time of the tasks which a given member is in charge of (i.e. total task execution time) on the browser 51 as exemplarily shown in FIG. 11 or 12 (Step S1316).

Figure 14:
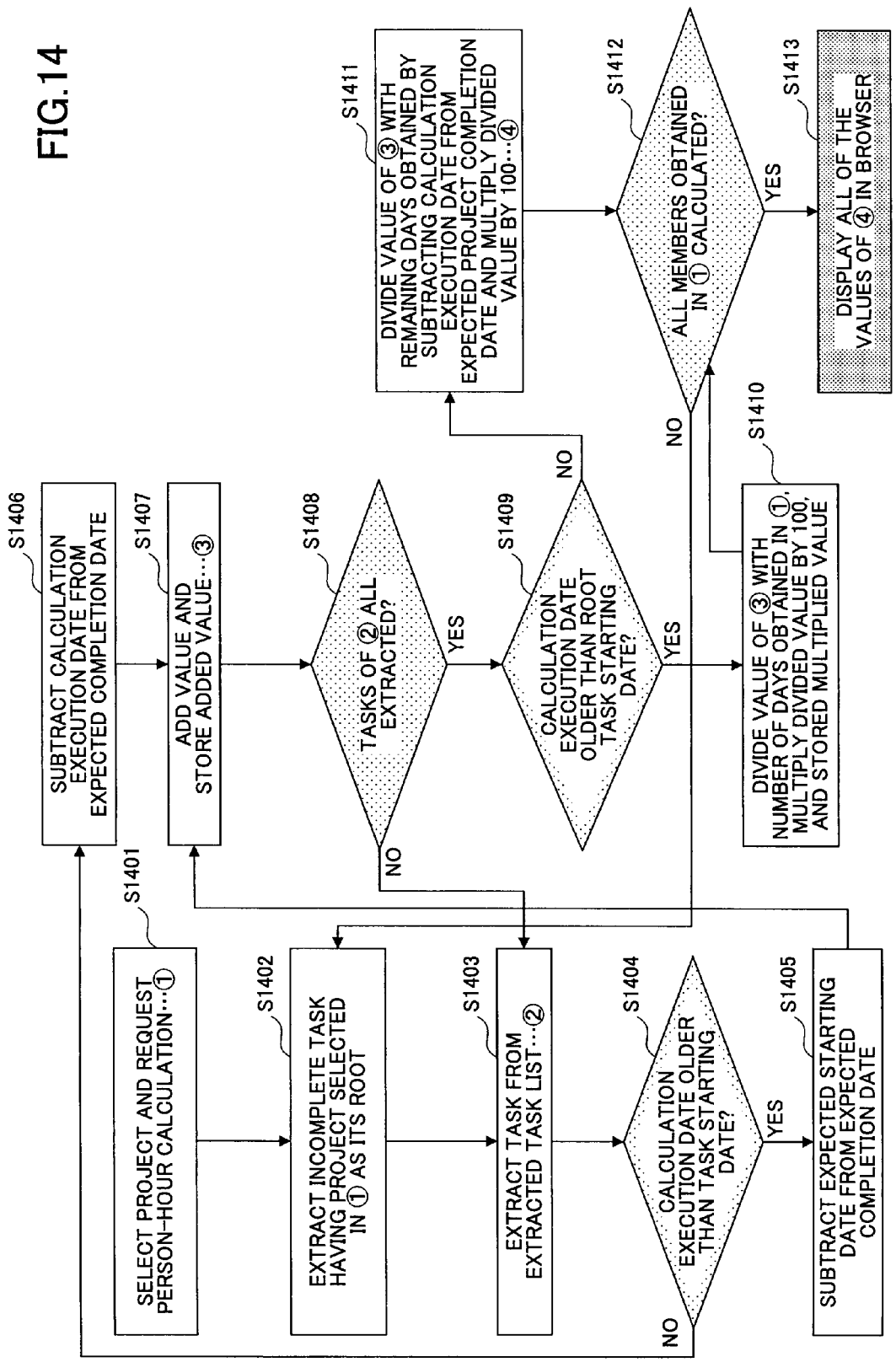
FIG. 14 is a flowchart showing an exemplary process of calculating of busyness of a member(s) according to an embodiment of the present invention.
Figure 15:
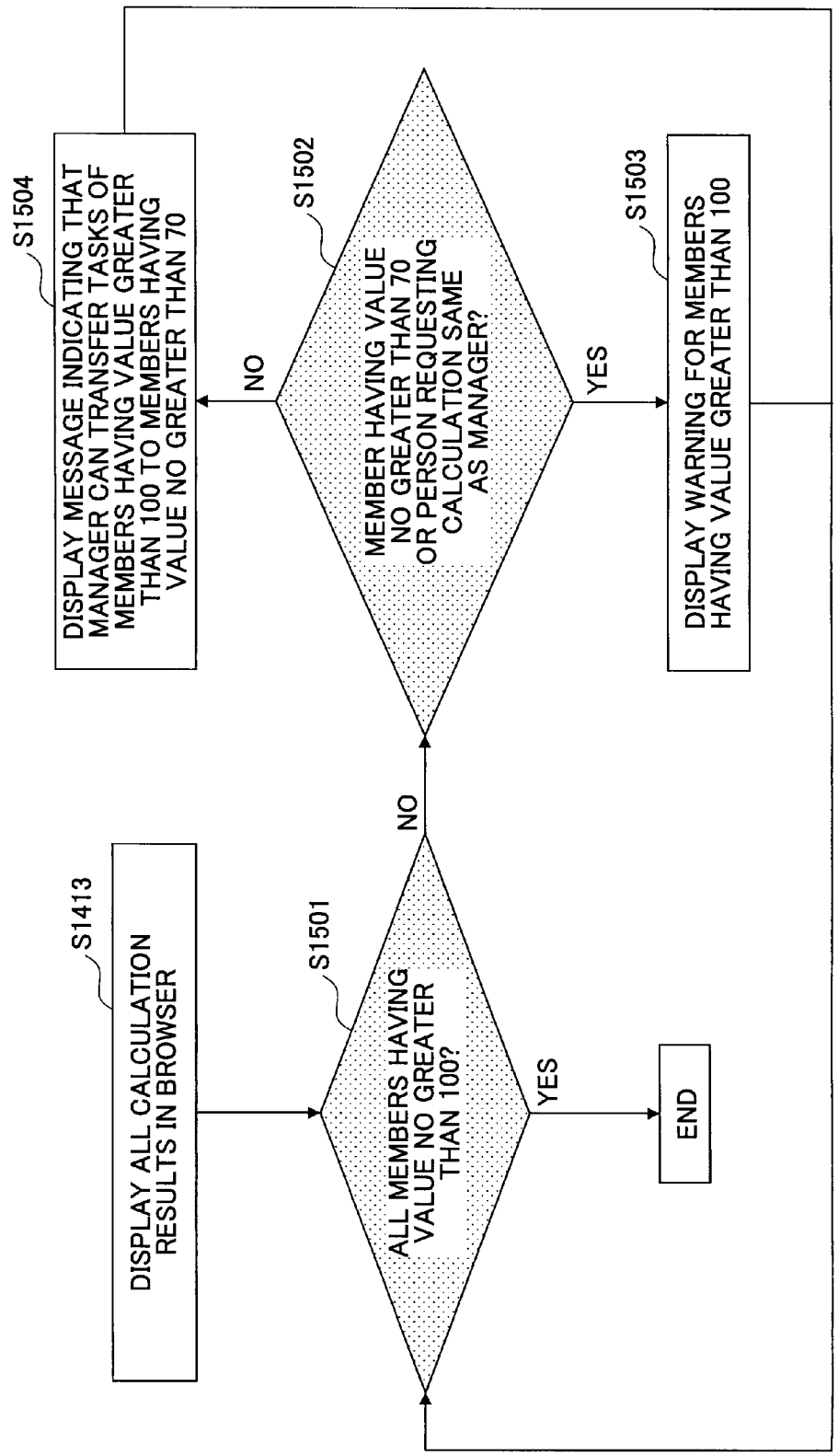
FIG. 15 is a flowchart showing an exemplary process of generating support data according to an embodiment of the present invention.
Figure 16:
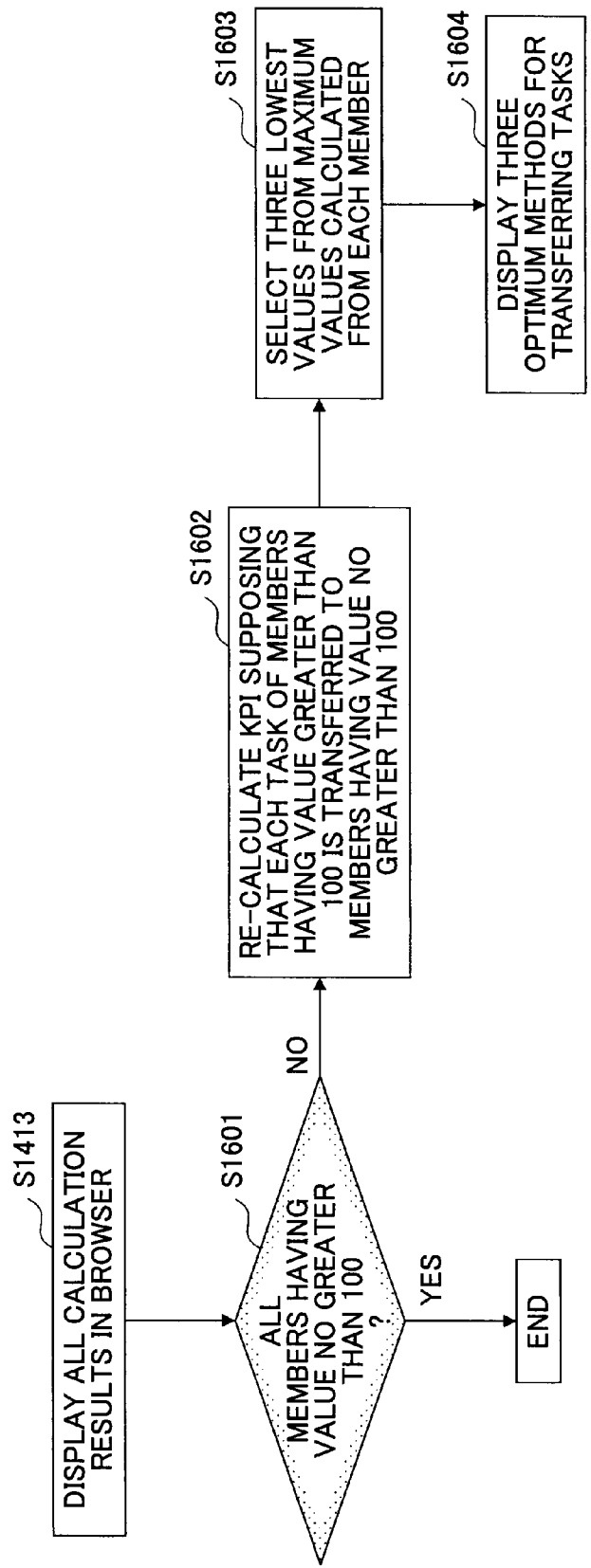
FIG. 16 is a flowchart showing an exemplary process of generating support data according to another embodiment of the present invention.

Next, a process of calculating busyness of a member(s) and a process of generating support information (support data) with the workflow managing system 100 according to the third embodiment are described in detail. FIG. 14 is a flowchart showing an exemplary process of calculating of busyness of a member(s) according to an embodiment of the present invention. FIGS. 15 and 16 are flowcharts showing exemplary processes of generating support data according to an embodiment of the present invention.

First, a user U selects a project displayed on the browser 501 and selects person-hour calculation. Accordingly, the browser 501 requests person-hour calculation of the project selected by the user U (Step S1401).

Then, the calculation reception part 1402 extracts a task list including tasks which are not finished (incomplete task) where the person in charge of the incomplete task is a given member and the root of the incomplete task is the selected project (Step S1402). Then, the calculation reception part 1402 extracts a given task from the extracted task list (Step S1403).

Then, the task details managing part 504 determines whether a calculation execution date is older than an expected starting date of the extracted task (Step S1404). In a case where the calculation execution date is older than the expected starting date of the extracted task, the task details managing part 504 subtracts the expected starting date from an expected completion date of the task extracted in Step S1403 (Step S1405). Then, the task details managing part 504 adds and stores the value obtained by subtracting the expected starting date from the expected completion date of the task (subtracted value) in the recording part 1302 (Step S1407).

In a case where the calculation execution date is not older than the expected starting date of the extracted task, the task details managing part 504 subtracts the calculation execution date from the expected completion date of the task extracted in Step S1403 (Step S1406). Then, the task details managing part 504 adds and stores the value obtained by subtracting the calculation execution date from the expected completion date of the task (Step S1407).

Then, the task managing part 503 determines whether all of the tasks have been extracted from the task list extracted in Step S1402 (Step S1408). In a case where all of the tasks are not extracted, the task managing part 503 returns to Step S1403 for extracting a given task which is not yet extracted from the task list extracted in Step S1402, to thereby repeat the process including the Steps S1404-S1408.

In a case where all of the tasks are extracted, the calculation executing part 505 determines whether the calculation execution date is older than the starting date of the root task (Step S1409). In a case where the calculation execution date is older than the starting date of the root task, the calculation executing part 505 divides the value added and stored in the recording part 1302 (total task execution time) with the project period (number of days of the period obtained in ①), multiplies the divided value obtained by the division by 100, and stores the multiplied value (Step S1410).

In a case where the calculation execution date is not older than the starting date of the root task, the calculation executing part 505 divides the value added and stored in the recording part 1302 (total task execution time) with the value obtained by subtracting the calculation execution date from the expected completion date of the task extracted in Step S1403, multiplies the divided value obtained by the division by 100, and stores the multiplied value (Step S1411).

After Step S1410 or S1411, the calculation reception part 502 determines whether calculation for all members in charge of the project is completed (Step S1412). In a case where calculation for all members in charge of the project is not completed, the calculation reception part 502 returns to Step S1402 and starts calculations for other given members which have not been calculated.

In a case where calculation for all members in charge of the project is completed, the calculation reception part 502 displays all of the values stored in Steps 1410 or S1411 on the browser 501.

Next, as shown in the flowchart of FIG. 15, the workflow management system 100 according to the third embodiment can explicitly indicate support data to the user U by sending different messages to the browser 501 according to calculation results.

After the process of Step S1413 of FIG. 14, the calculation executing part 505 determines whether each of the values stored in Step S1410 or S1411 of FIG. 14 (calculated value) is no greater than 100 (Step S1501). In a case where each of the calculated values is no greater than 100, the calculation executing part 505 completes the processes illustrated in the flowchart of FIG. 15.

Meanwhile, in a case where any one of the calculated values is greater than 100, the calculation executing part 505 determines whether there is any member having a calculated value no greater than 70 or whether the person requesting calculation is the manager (Step S1502).

In a case where there are no members having a calculated value no greater than 70 or where the person requesting calculation is not the manager, the calculation executing part 505 displays a warning on the browser 501 by identifying the members having a calculated value greater than 100 (Step S1503). Meanwhile, in a case where there is a member having a calculated value no greater than 70 or where the person requesting calculation is the manager, the calculation executing part 505 displays a message on the browser 501 indicating that the tasks of the members having a calculated value greater than 100 can be transferred to members having a calculated value no greater than 70 (Step S1504).

Next, as shown in the flowchart of FIG. 16, the workflow management system 100 according to the third embodiment can explicitly indicate support data to the user U by sending different messages to the browser 501 according to calculation results.

After the process of Step S1413 of FIG. 14, the calculation executing part 505 determines whether each of the values stored in Step S1410 or S1411 of FIG. 14 (calculated value) is no greater than 100 (Step S1601). In a case where each of the calculated values is no greater than 100, the calculation executing part 505 completes the processes illustrated in the flowchart of FIG. 15.

Meanwhile, in a case where any one of the calculated values is greater than 100, the calculation executing part 505 re-calculates KPI by using Formula 3 by supposing that each task of the member(s) having a calculated value greater than 100 is transferred to every member having a calculated value no greater than 100 (Step S1602).

Then, the calculation executing part 1603 determines three optimum approaches (methods) of transferring tasks by selecting, for example, three maximum values of each member starting from the lowest one (i.e. lowest three maximum values) among the re-calculated values (Step S1603). Then, the calculation executing part 1603 displays the three optimum methods for transferring tasks selected in Step S1603 on the browser 501 (Step S1604).

With the workflow management system 100 according to the third embodiment, a project can be efficiently managed by using busyness of members.

Fourth Embodiment

The workflow management system 100 according to the fourth embodiment of the present invention (hereinafter also simply referred to as "workflow management system 100 according to the fourth embodiment") uses a proportion of the total time required for completing a project during a predetermined period as the performance evaluation index, in which the proportion is obtained by multiplying the average working hours of a member(s) in charge of a project with the number of members of the project. The proportion of the total time required for completing a project during a predetermined period is defined as the below-described Formula 4. In Formula 4, the performance evaluation index is expressed with a KPI (Key Performance Indicator).

[Formula 4]

$$KPI = \frac{1}{u} \times \frac{s}{m} \quad (4)$$

In Formula 4, "U" is the average working hours of a member in charge of a project, "s" indicates "total time required for completing a task(s), and "m" indicates the number of members.

For example, Formula 4 shows the busyness of a project. It is to be noted that Formula 4 is not limited to being applied to a project but may also be applied to a sub-tree having a given task as its root. The schedule of a project becomes tighter as the value of Formula 4 becomes greater.

The same as the workflow management system 100 according to the first embodiment, the workflow management system 100 according to the fourth embodiment is described with a Usage Example.

Usage Example

In the usage example shown in FIG. 17, a manager of two projects "Project A" and "Project B" transfers a new task (work) to a team (member) that is in charge of one of the projects. The manager calculates a KPI value by using Formula 4 for determining which of "Project A" and "Project B" is busier. Accordingly, the manager can transfer the new task to a team having a KPI value lower than the other, that is, a team which is not busier than the other.

Figure 18:
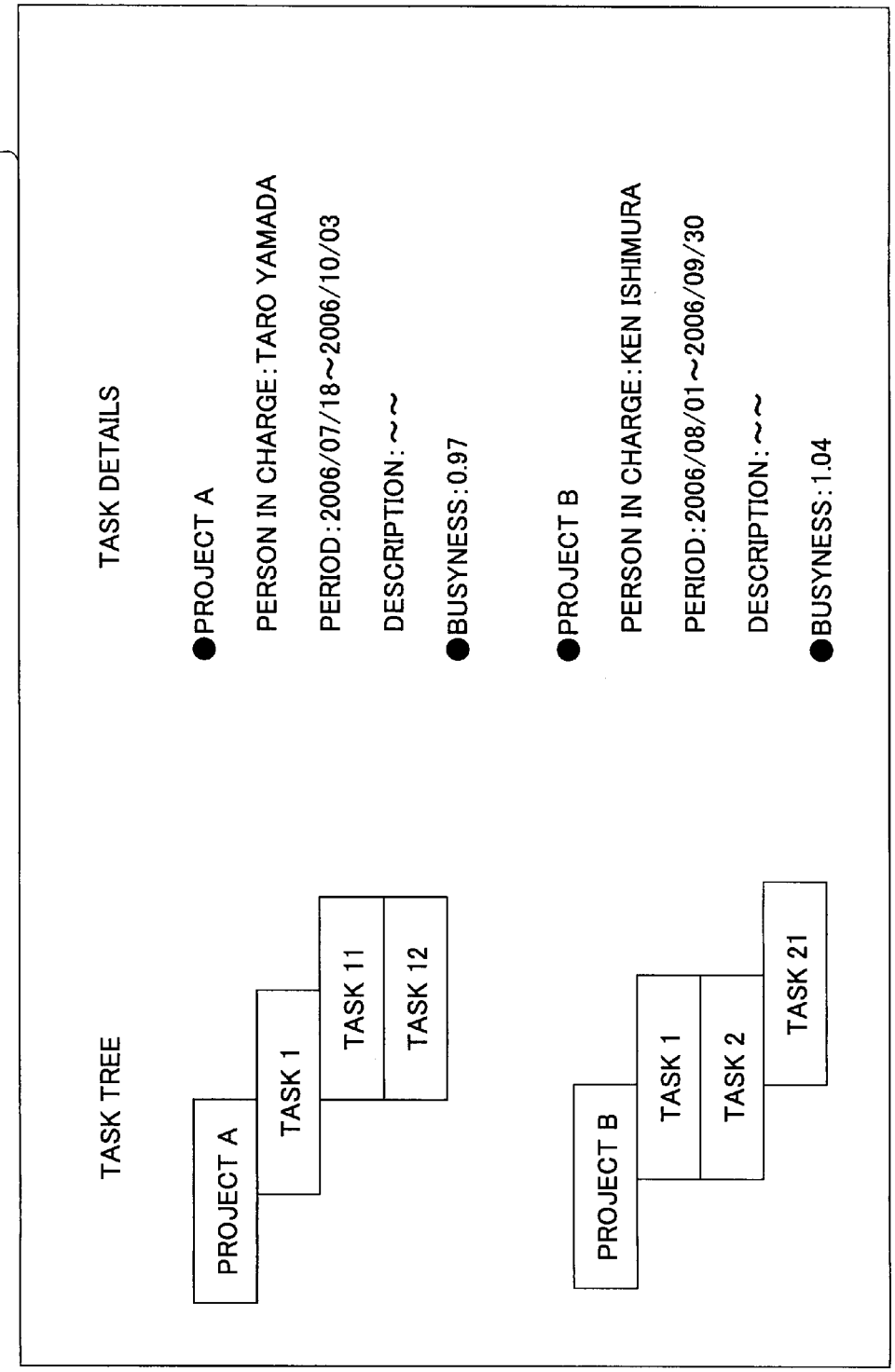
FIG. 18 is a schematic diagram showing an input/output screen displayed on a user-terminal according to the workflow management system according to the fourth embodiment of the present invention.

FIG. 18 is a schematic diagram showing an input/output screen 1800 displayed on a user-terminal according to the workflow management system according to the fourth embodiment. In the input/output screen 1800 shown in FIG. 18, a task tree is displayed on the left side of the screen while details of tasks are displayed on the right side of the screen. For example, a task tree for "Project A" and a task tree for "Project B" are shown on the left side of the screen. The details of tasks displayed on the right side of the screen include, for example, project data (project information) corresponding to Projects A and B, and the results of calculating the KPI value (busyness) by using the Formula 4 on Projects A and B (in this example, "0.97" and "1.04").

Next, a process of the workflow management system 100 for displaying the input/output screen 1800 of FIG. 18 on the browser 501 is described with reference to the sequence diagram shown in FIG. 19.

Figure 19:
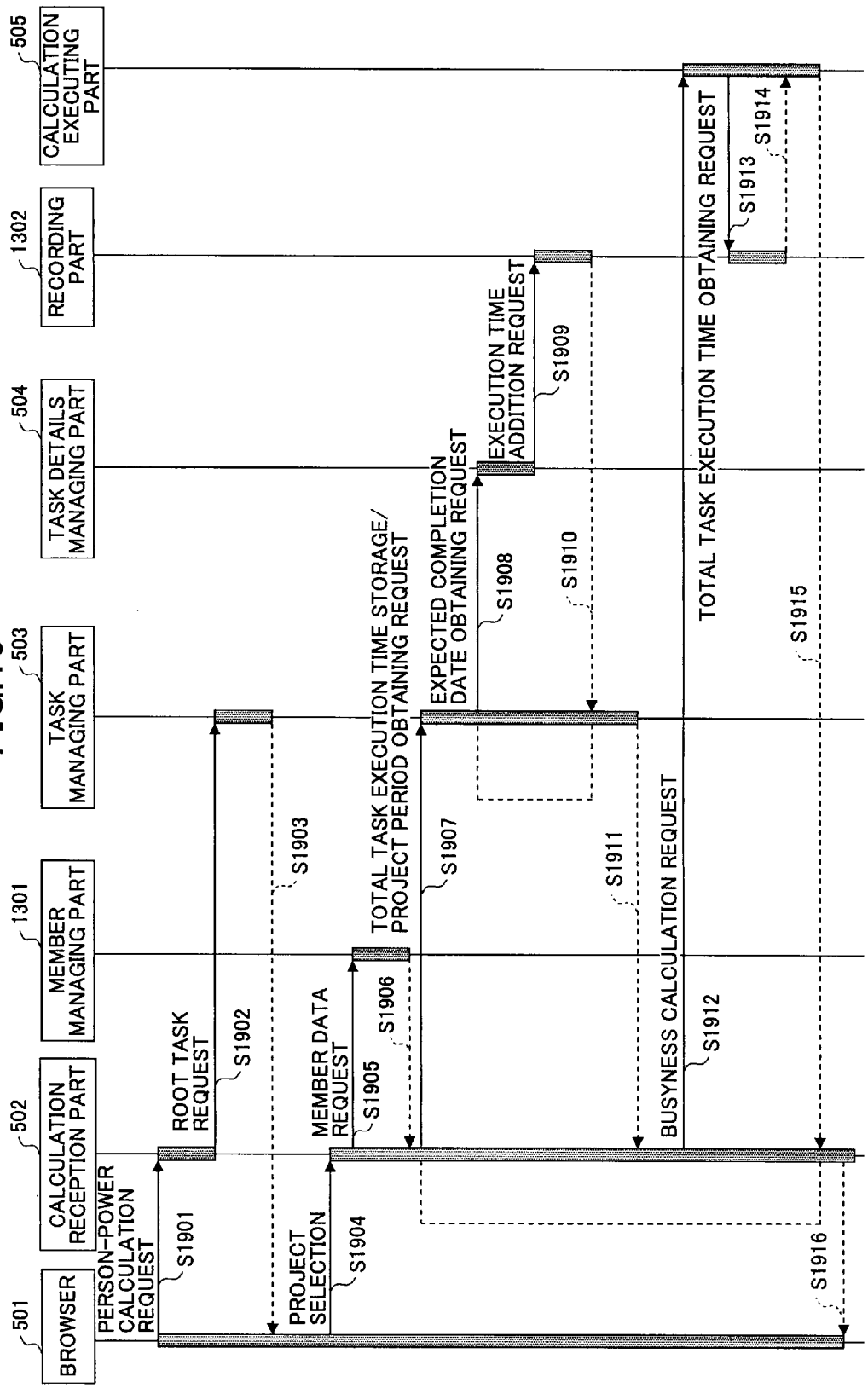
FIG. 19 is a sequence diagram showing a process of calculating busyness of a project with the workflow management system according to the fourth embodiment of the present invention.

FIG. 19 is a sequence diagram showing a process of calculating busyness of a project with the workflow management system according to the fourth embodiment.

It is to be noted that a browser 501 shown in FIG. 19 is installed in the user-terminal. Furthermore, a calculation reception part 502, a task managing part 503, a task details managing part 504, a calculation executing part 505, a member managing part 1301, and a recording part 1302 are controlled by the workflow management system 100.

First, the browser 501 installed in the user-terminal sends a request for calculating person-hours (person-hour calculation request) to the calculation reception part 502 of the workflow management system 100 in accordance with a request from the user U (Step S1901). The calculation reception part 502 sends a request for a root task (project) to the task managing part 503 based on the person-hour calculation request (Step S1902). The browser 501 obtains data of the root task (project) from the task managing part 503 (Step S1903). The browser 501 displays a screen (not shown) enabling a project to be selected by the user in accordance with the project data obtained from the task managing part 503. The browser 501 reports the project selected by user to the calculation reception part 502 (Step S1904).

The calculation reception part 502 designates the project selected by the user and sends a request for member data corresponding to the member(s) in charge of the designated project to the member managing part 1301 (Step S1905). Then, the calculation reception part 502 obtains the requested member data corresponding to the member(s) in charge of the designated project from the member managing part 1301 (Step S1906).

The calculation reception part 502 sends a request for storing a total task execution time and obtaining a project period to the task managing part 503 (Step S1907). The task managing part 503 sends a request for obtaining an expected completion date of the task(s) included in the project to the task details managing part 504 (Step S1908). The task details managing part 504 calculates the execution time based on the expected completion date of the task(s) and sends a request for adding and storing the calculated execution time (execution time addition request) to the recording part 1302 (Step S1909). After the recording part 1302 completes storing the execution time, the task managing part 503 receives a response from the recording part 1302 (Step S1910). The process including the Steps S1908-S1910 is repeated for a number of times equal to the number of tasks included in the project.

After the process including the Steps S1908-S1910 is repeated for a number of times equal to the number of tasks included in the project, the calculation reception part 502 receives a response from the task managing part 503. Then, the calculation reception part 502 sends a request for calculating busyness of the project to the calculation executing part 505 (Step S1912).

The calculation executing part 505 sends a request for obtaining the total execution time of the tasks included in the project (i.e. added execution time of the tasks included in the project) to the recording part 1302 (Step S1913). Accordingly, the calculation execution part 505 obtains the total task execution time from the recording part 1302 (Step S1914). The calculation execution part 505 calculates busyness of the project by using the Formula 4 based on a predetermined period obtained by multiplying the total execution time of the tasks included in the project and the average working hours of the members in charge of the project with the number of members and sends the calculation result to the calculation reception part 502 (Step S1915).

It is to be noted that the process including Steps S1907-S1915 is repeated for a number of times equal to the number of projects. After the process including Steps S1907-S1915 is repeated for a number of times equal to the number of projects, the calculation reception part 502 displays the busyness of each project on the browser 51 as exemplarily shown in FIG. 18 (Step S1916).

Figure 20:
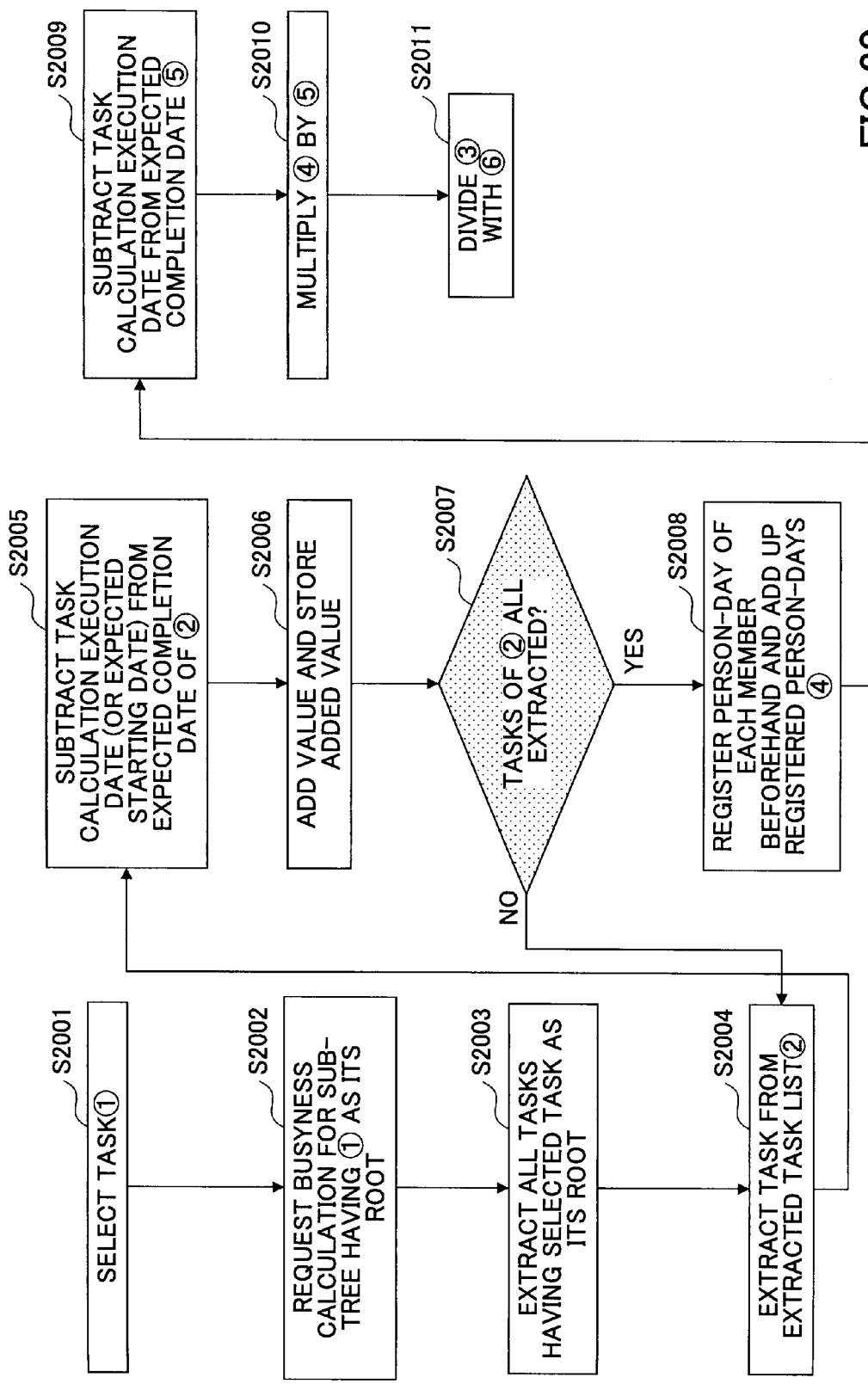
FIG. 20 is a flowchart showing an exemplary process of calculating busyness of a project(s) according to an embodiment of the present invention.

Next, a process of calculating busyness of a project(s) with the workflow managing system 100 according to the fourth embodiment is described in detail. FIG. 20 is a flowchart showing an exemplary process of calculating busyness of a project(s) according to an embodiment of the present invention.

First, a user U selects a given task from a task tree displayed on the browser 501 (Step S2001). Accordingly, the browser 501 requests busyness calculation of a sub-tree having the task selected by the user as its root (Step S2002).

Then, the task managing part 503 receives a request for calculating busyness from the browser 501 via the calculation reception part 1402. The task managing part 503 extracts a task list including tasks contained in a sub-tree having the task selected by the user as its root (Step S2003).

Then, the calculation reception part 1402 extracts a given task from the extracted task list (Step S2004). Then, the task details managing part 504 subtracts a task calculation execution date (or expected starting date) from an expected completion date of the task extracted in Step S2004 (Step S2005).

Then, the task details managing part 504 adds and stores the value obtained by the subtraction in Step S2005 (Step S2006). Then, the task managing part 504 determines whether all of the tasks have been extracted from the task list extracted in Step S2003 (Step S2004). In a case where all of the tasks are not extracted, the task managing part 503 returns to Step S2004 for extracting a given task which is not yet extracted from the task list extracted in Step S2003, to thereby repeat the process including the Steps S2004-S2007.

In a case where all of the tasks are extracted, the calculation executing part 505 adds up the person-days of the member(s) in charge of the tasks included in the sub-tree from the person-days of members registered beforehand (Step S2008).

Then, the calculation executing part 505 subtracts a task calculation execution date from an expected completion date of the task extracted in Step S2001 (Step S2009). Then, the calculation executing part 505 multiplies the value calculated in Step S2009 and the value added up in Step S2008 (Step S2010). Then, the calculation executing part 505 divides the value stored in the recording part 1302 in Step S2006 with the value obtained by the calculation in Step S2010 and displays the divided value in the browser 501 (Step S2011).

With the workflow management system 100 according to the fourth embodiment, a project can be efficiently managed by using busyness of a project.

Further, the present invention is not limited to these embodiments, but variations and modifications may be made without departing from the scope of the present invention.

The present application is based on Japanese Priority Application No. 2006-236728 filed on Aug. 31, 2006, with the Japanese Patent Office, the entire contents of which are hereby incorporated by reference.

What is claimed is:

1. A workflow management system for managing a workflow including a plurality of tasks, the workflow management system comprising:
 a task data memory that stores task data;
 a task control part that obtains task data from the task data storing part, calculating an index from the task data, and outputting an evaluation of the workflow based on the result of the calculation; and
 a processor that executes the task control part, wherein
 the task control part outputs a first warning prompting a user to modify the task when the index is greater than a first threshold and outputs a second warning prompting the user to modify the task when the index is greater than a second threshold,
 the task control part includes a determining part that determines whether or not a person requesting the result of the calculation is in charge of the tasks,
 when the determining part determines that the person requesting the result of the calculation is in charge of the tasks, the task control part outputs the result of the calculation and one of the first and second warnings for prompting the person to modify the tasks, and
 when the determining part determines that the person requesting the result of the calculation is not in charge of the tasks, the task control part outputs only the result of the calculation.

2. The workflow management system as claimed in claim 1, wherein the task control part calculates discrepancy of plans based on the number of days required for completing the tasks included in the task data or the actual number of days and outputs evaluation of the workflow using the discrepancy as a performance evaluation index.

3. The workflow management system as claimed in claim 2, wherein the first threshold is 5% of the task period selected by a user, and the second threshold is 10% of the task period.

4. The workflow management system as claimed in claim 1, wherein the task control part calculates delay of plans based on the number of days required for completing the tasks included in the task data or the actual number of days and outputs evaluation of the workflow using the delay as a performance evaluation index.

5. The workflow management system as claimed in claim 4, wherein the first threshold is 5% of the task period selected by a user, and the second threshold is 10% of the task period.

6. The workflow management system as claimed in claim 5, wherein the task control part calculates the index from the task data corresponding to a part of or all of the tasks included in the workflow and outputs an evaluation of a part of or all of the workflow based on the result of the calculation.

7. A workflow management system for managing a workflow including a plurality of tasks, the workflow management system comprising:
a task data memory that stores task data;
a task control part that obtains task data from the task data storing part, calculates an index from the task data, and outputs an evaluation of the workflow based on the result of the calculation; and
a processor that executes the task control part, wherein
the task control part refers to the number of days for a plurality of members in charge of the tasks included in the task data to complete the tasks in a future predetermined period, calculates the total of the number of days required for each of the plural members to complete the tasks that they are in charge of, and outputs evaluation of the workflow by using the proportion of the total number of days required for completing the tasks in the future predetermined period as a performance evaluation index.

8. The workflow management system as claimed in claim 7, wherein the task control part outputs a warning when the proportion of the total number of days required for a member to complete the tasks in the future predetermined period is greater than a threshold.

9. The workflow management system as claimed in claim 7, wherein when the proportion of the total number of days required for a first member to complete the tasks in the future predetermined period is greater than a first threshold, a second member is output as a destination for transferring the tasks, wherein the proportion of the total number of days required for the second member to complete the tasks in the future predetermined period is no greater than a second threshold.

10. A workflow management system for managing a workflow including a plurality of tasks, the workflow management system comprising:
a task data memory that stores task data;
a task control part that obtains task data from the task data storing part, calculates an index from the task data, and outputs an evaluation of the workflow based on the result of the calculation; and
a processor that executes the task control part, wherein
the task control part outputs an evaluation of the workflow based on the total number of days required for completing the tasks included in the workflow and a future predetermined period calculated from the number of members in charge of the tasks and the average working hours of the members.

11. The workflow management system as claimed in claim 1, wherein the tasks can be designated according to a parent-child relationship or a sequential relationship with respect to other tasks.

12. A workflow management method, implemented by a processor of a computer, for managing a workflow including a plurality of tasks, the workflow management method comprising the steps of:
obtaining task data stored in a task data memory;
calculating, with the processor, an index from the obtained task data;
outputting an evaluation of the workflow based on the result of the calculation;
determining if a person requesting the result of the calculation is in charge of the tasks;
outputting, when the person requesting the result of the calculation is in charge of the task, a first warning prompting a user to modify the task if the index is greater than a first threshold, and outputting a second warning prompting the user to modify the task if the index is greater than a second threshold; and
outputting, when the person requesting the result of the calculation is not in charge of the task, only the result of the calculation.

13. The workflow management method as claimed in claim 12, wherein
the calculating includes calculating discrepancy of plans based on the number of days required for completing the tasks included in the task data or the actual number of days, and
the outputting includes outputting evaluation of the workflow using the discrepancy as a performance evaluation index.

14. The workflow management method as claimed in claim 13, wherein the first threshold is 5% of the task period selected by a user, and the second threshold is 10% of the task period.

15. The workflow management method as claimed in claim 12, wherein
the calculating includes calculating delay of plans based on the number of days required for completing the tasks included in the task data or the actual number of days, and
the outputting includes outputting evaluation of the workflow using the delay as a performance evaluation index.

16. The workflow management method as claimed in claim 15, wherein the first threshold is 5% of the task period selected by a user, and the second threshold is 10% of the task period.

17. The workflow management method as claimed in claim 12, wherein
the calculating includes calculating the index from the task data corresponding to a part of or all of the tasks included in the workflow, and
the outputting includes outputting an evaluation of a part of or all of the workflow based on the result of the calculation.

18. A workflow management method implemented by a processor of a computer, comprising:
obtaining task data stored in a task data memory;
calculating, with the processor, an index from the obtained task data; and
outputting an evaluation of the workflow based on the result of the calculation, wherein
the calculating includes referring to the number of days for a plurality of members in charge of the tasks included in the task data to complete the tasks in a future predetermined period and calculating the total of the number of days required for each of the plural members to complete the tasks that they are in charge of, and
the outputting includes outputting evaluation of the workflow by using the proportion of the total number of days required for completing the tasks in the future predetermined period as a performance evaluation index.

19. The workflow management method as claimed in claim 18, wherein the outputting includes outputting a warning when the proportion of the total number of days required for a member to complete the tasks in the future predetermined period is greater than a threshold.

20. A workflow management method, implemented by a processor of a computer, comprising:
  obtaining task data stored in a task data memory;
  calculating, with the processor, an index from the obtained task data; and
  outputting an evaluation of the workflow based on the result of the calculation, wherein
  when the proportion of the total number of days required for a first member to complete the tasks in a future predetermined period is greater than a first threshold, the outputting includes outputting a second member as a destination for transferring the tasks, wherein the proportion of the total number of days required for the second member to complete the tasks in the future predetermined period is no greater than a second threshold.

* * * * *

UNITED STATES PATENT AND TRADEMARK OFFICE
CERTIFICATE OF CORRECTION

PATENT NO. : 8,155,988 B2
APPLICATION NO. : 11/846113
DATED : April 10, 2012
INVENTOR(S) : Yohei Kunichika et al.

It is certified that error appears in the above-identified patent and that said Letters Patent is hereby corrected as shown below:

On the title page, Item (30), The Foreign Application Priority Data information is missing.
Item (30) should read:

--(30)    Foreign Application Priority Data

Aug. 31, 2006   (JP)...............................2006-236728--

Signed and Sealed this
Fifth Day of June, 2012

David J. Kappos
*Director of the United States Patent and Trademark Office*